United States Patent
Behling et al.

(10) Patent No.: US 12,287,642 B2
(45) Date of Patent: Apr. 29, 2025

(54) SORTING SYSTEM AND METHOD FOR CONTROLLING A SORTING SYSTEM

(71) Applicant: Fraunhofer-Gesellschaft zur Förderung der angewandten Forschung e.V., Munich (DE)

(72) Inventors: Jan Behling, Dortmund (DE); Mathias Rotgeri, Dortmund (DE); Jan Sören Emmerich, Dortmund (DE); Dirk Höning, Dortmund (DE); Patrick Klokowski, Dortmund (DE); Christian Hammermeister, Dortmund (DE); Michael Ten Hompel, Dortmund (DE)

(73) Assignee: Fraunhofer-Gesellschaft zur Förderung der angewandten Forschung e.V., Munich (DE)

( * ) Notice: Subject to any disclaimer, the term of this patent is extended or adjusted under 35 U.S.C. 154(b) by 166 days.

(21) Appl. No.: 18/352,431

(22) Filed: Jul. 14, 2023

(65) Prior Publication Data
US 2023/0359222 A1 Nov. 9, 2023

Related U.S. Application Data

(63) Continuation of application No. PCT/EP2022/050711, filed on Jan. 14, 2022.

(30) Foreign Application Priority Data

Jan. 15, 2021 (DE) ..................... 10 2021 200 339.7

(51) Int. Cl.
*B07C 3/02* (2006.01)
*B07C 5/36* (2006.01)
(Continued)

(52) U.S. Cl.
CPC ........... *G05D 1/0291* (2013.01); *B07C 99/00* (2022.08); *B07C 2501/0063* (2013.01)

(58) Field of Classification Search
CPC ............ B07C 3/02; B07C 5/36; G05D 1/0223
See application file for complete search history.

(56) References Cited

U.S. PATENT DOCUMENTS 9,580,002 B2 2/2017 Jochim et al.
11,199,853 B1 * 12/2021 Afrouzi .................. B25J 13/006
(Continued)

FOREIGN PATENT DOCUMENTS

CN 208 018 986 U 10/2018
DE 10 2008 039 764 A1 5/2010
(Continued)

OTHER PUBLICATIONS

Screenshots of video: https://www.youtube.com/watch?v=kOuaj7gkFKM, and website: https://www.lotsofbots.com/en/zhejiang-guozi-robotics-co/mini-10/, Dec. 27, 2021.
(Continued)

*Primary Examiner* — Long T Tran
(74) *Attorney, Agent, or Firm* — Bridgeway IP Law Group, PLLC; Jihun Kim

(57) ABSTRACT

A sorting system includes a first number of entry points configured to provide sorting goods. The sorting system further has a second number of terminal points configured to receive the sorting goods, and a third number of driverless sorting vehicles configured to transport the sorting goods between the first number of insertion points and the second number of terminal points. Further, a control device is provided, configured to control the driverless sorting vehicles between the first number of insertion points and the second number of terminal points.

28 Claims, 21 Drawing Sheets

(51) Int. Cl.
  *B07C 99/00* (2009.01)
  *G05D 1/00* (2006.01)
  *G05D 1/02* (2020.01)

(56) References Cited

U.S. PATENT DOCUMENTS

| | | | | |
|---|---|---|---|---|
| 2011/0106362 | A1* | 5/2011 | Seitz | G05D 1/0214 |
| | | | | 701/24 |
| 2019/0230850 | A1* | 8/2019 | Johnson | B65G 67/02 |
| 2020/0002094 | A1* | 1/2020 | Schedlbauer | B65G 1/1375 |
| 2020/0048019 | A1 | 2/2020 | Werner | |
| 2020/0122927 | A1* | 4/2020 | Bellar | G06Q 10/087 |
| 2021/0072761 | A1* | 3/2021 | Lee | B60W 10/18 |
| 2021/0073716 | A1* | 3/2021 | Dearing | G06Q 10/083 |
| 2021/0146889 | A1* | 5/2021 | Kuehne | G05D 1/0225 |
| 2021/0171295 | A1 | 6/2021 | Azuma et al. | |
| 2021/0214055 | A1* | 7/2021 | Maydanik | E02B 15/046 |
| 2021/0247774 | A1* | 8/2021 | Hotta | G05D 1/0297 |
| 2022/0281375 | A1 | 9/2022 | Behling et al. | |
| 2022/0289478 | A1* | 9/2022 | Moradnia | G05D 1/0293 |
| 2022/0289505 | A1* | 9/2022 | Behling | B65G 67/24 |
| 2023/0159058 | A1* | 5/2023 | Polyakov | B60Q 1/549 |
| | | | | 701/25 |

FOREIGN PATENT DOCUMENTS

| | | |
|---|---|---|
| DE | 10 2018 213 680 A1 | 2/2020 |
| DE | 10 2018 130 302 A1 | 6/2020 |
| DE | 10 2019 122 052 A1 | 2/2021 |
| DE | 10 2019 122 055 A1 | 2/2021 |
| DE | 10 2019 134 973 A1 | 6/2021 |
| DE | 11 2019 004 214 T5 | 6/2021 |
| DE | 10 2020 121 883 A1 | 2/2022 |
| EP | 3 690 775 A1 | 8/2020 |
| EP | 3 722 909 A1 | 10/2020 |
| EP | 3 757 045 A1 | 12/2020 |
| JP | 2011-218920 A | 11/2011 |
| JP | 2019-051737 A | 4/2019 |
| JP | 2019-127116 A | 8/2019 |
| WO | 2020/064305 A1 | 4/2020 |
| WO | 2022038049 A1 | 2/2022 |

OTHER PUBLICATIONS

Screenshots of video: https://www.youtube.com/watch?v=YWSSFMHHkNY, and website: DFW International Airport partners with Vanderlande on autonomous vehicle solution FLEET—Vanderlande, Nov. 12, 2019.

Screenshots of video: https://www.youtube.com/watch?v=EbLDXsEPHS8, and website: Tompkins Robotics tSort System | Automated Sortation Systems | Bastian Solutions, Mar. 10, 2018.

Screenshots of video: https://www.youtube.com/watch?v=qt8ux1EYQU4, and website: This swarm of robots gets smarter the more it works | CNN, Apr. 15, 2017.

Screenshots of video: https://www.youtube.com/watch?v=RzDh9mavPfk, and website: Solutions for Automated Guided Vehicles (AGV) | Kendrion, Sep. 5, 2019.

Screenshots of video: https://www.youtube.com/watch?v=t3BeW7pJzEw, and website: Implementation of the first robotics packet sorting system by Greek+ and Hongkong Post | RoboticsTomorrow, Mar. 19, 2019.

Kenichi Ohko, "Office Action for JP Application No. 2023-542933", Jul. 26, 2024, JPO, Japan.

* cited by examiner

SORTING SYSTEM AND METHOD FOR CONTROLLING A SORTING SYSTEM

CROSS-REFERENCE TO RELATED APPLICATIONS

This application is a continuation of copending International Application No. PCT/EP2022/050711, filed Jan. 14, 2022, which is incorporated herein by reference in its entirety, and additionally claims priority from German Application No. 10 2021 200 339.7, filed Jan. 15, 2021, which is also incorporated herein by reference in its entirety.

TECHNICAL FIELD

The present invention relates to a sorting system and to a method, optionally computer-assisted, for controlling such a sorting system. In particular, the present invention relates to an infrastructure-reduced sorting system with vehicles.

BACKGROUND OF THE INVENTION

While sorting, distributing and/or delivering sorting goods or load goods, one requirement may be to transport these sorting goods from one position to another. Manual, machine-assisted or even partially or fully automated processes are conceivable for this purpose. In most cases, sorting goods arrive in sorting systems in stacked form or as bulk material, e.g. in trolleys or containers. These are usually taken out manually and placed individually on a conveyor belt. In some cases, automatic devices are also used into which the sorting goods are fed as a pile. However, these entail a certain amount of space and are relatively expensive.

After separation (i.e. creating a space between the individual packages), the sorting goods are fed to the actual sorter (sorting device). Fixed linear or ring-shaped sorting systems are used for automatic sorting. These have, for example, a large number of folding trays or conveyor belts driven transverse to the conveying direction, onto which the previously separated sorting goods are discharged at relatively high speed at a central infeed.

Usually, the sorter is placed on posts. On the exemplary folding trays, the sorting good is then conveyed along the terminal points, which are usually arranged on both sides and are present in large numbers. At the terminal point assigned to the sorting goods, the sorting good is discharged laterally. The terminal point is usually implemented as a chute in order to reach the end of the terminal point by gravity and to realize a certain buffer capacity. For this purpose, placing the sorter on posts is advantageous. Usually, the sorting good is then removed manually from the terminal stations and placed, for example, in a trolley or container, possibly with additional mechanical support.

In addition, some sorting systems with automatic vehicles are also known. All systems known to date share the characteristic that the vehicles used have active load receiving means, specifically a tray that can be folded on one side, or a conveyor belt that can be driven in both directions. The routes in the sorting system are either grid-shaped, for example a plurality, all of which are set up for parcel shipments, or in the form of a circle, possibly with secondary circles, for example for transporting suitcases.

Of disadvantage in the known sorting systems is the complex setup of such routes or the infrastructure used.

Therefore, there is need for a flexible sorting system and a method for controlling such a sorting system.

Therefore, one object of the present invention is to provide a sorting system which can be set up flexibly, and further to provide a method for controlling such a sorting system.

SUMMARY

According to an embodiment, a sorting system may have: a first number of insertion points configured to provide sorting goods; a second number of terminal points configured to receive the sorting goods; a third number of driverless sorting vehicles configured to transport the sorting goods between the first number of insertion points and the second number of terminal points; and a control device configured to control the driverless sorting vehicles between the first number of insertion points and the second number of terminal points; wherein at least one driverless sorting vehicle is configured to discharge the sorting good using kinetic energy of the sorting good provided by a travel motion of the driverless sorting vehicle, based on a change of a speed vector of the driverless sorting vehicle.

According to another embodiment, a sorting system may have: a first number of insertion points configured to provide sorting goods; a second number of terminal points configured to receive the sorting goods; a third number of driverless sorting vehicles configured to transport the sorting goods between the first number of insertion points and the second number of terminal points; and a control device configured to control the driverless sorting vehicles between the first number of insertion points and the second number of terminal points; wherein at least one driverless sorting vehicle of the third number of driverless sorting vehicles has an interface configured to receive different tools based on a coupling.

According to an embodiment, a sorting system comprises a first number of insertion points configured to provide sorting goods, a second number of terminal points configured to receive the sorting goods, and a third number of driverless sorting vehicles configured to transport the sorting goods between the first number of insertion points and the second number of terminal points. Further, a control device is provided configured to control the driverless sorting vehicles between the first number of insertion points and the second number of terminal points.

According to an embodiment, a method for controlling a sorting system comprises controlling driverless sorting vehicles between a first number of insertion points and a second number of terminal points to provide sorting goods at the first number of insertion points, receive the sorting goods at the second number of terminal points by using a third number of driverless sorting vehicles to transport the sorting goods between the first number of insertion points and the second number of terminal points.

Another embodiment creates a computer program product having program code for executing such a method.

BRIEF DESCRIPTION OF THE DRAWINGS

Particularly advantageous embodiments will be explained in more detail below making reference to the accompanying drawings, in which.

DETAILED DESCRIPTION OF THE INVENTION

Figure 1A:
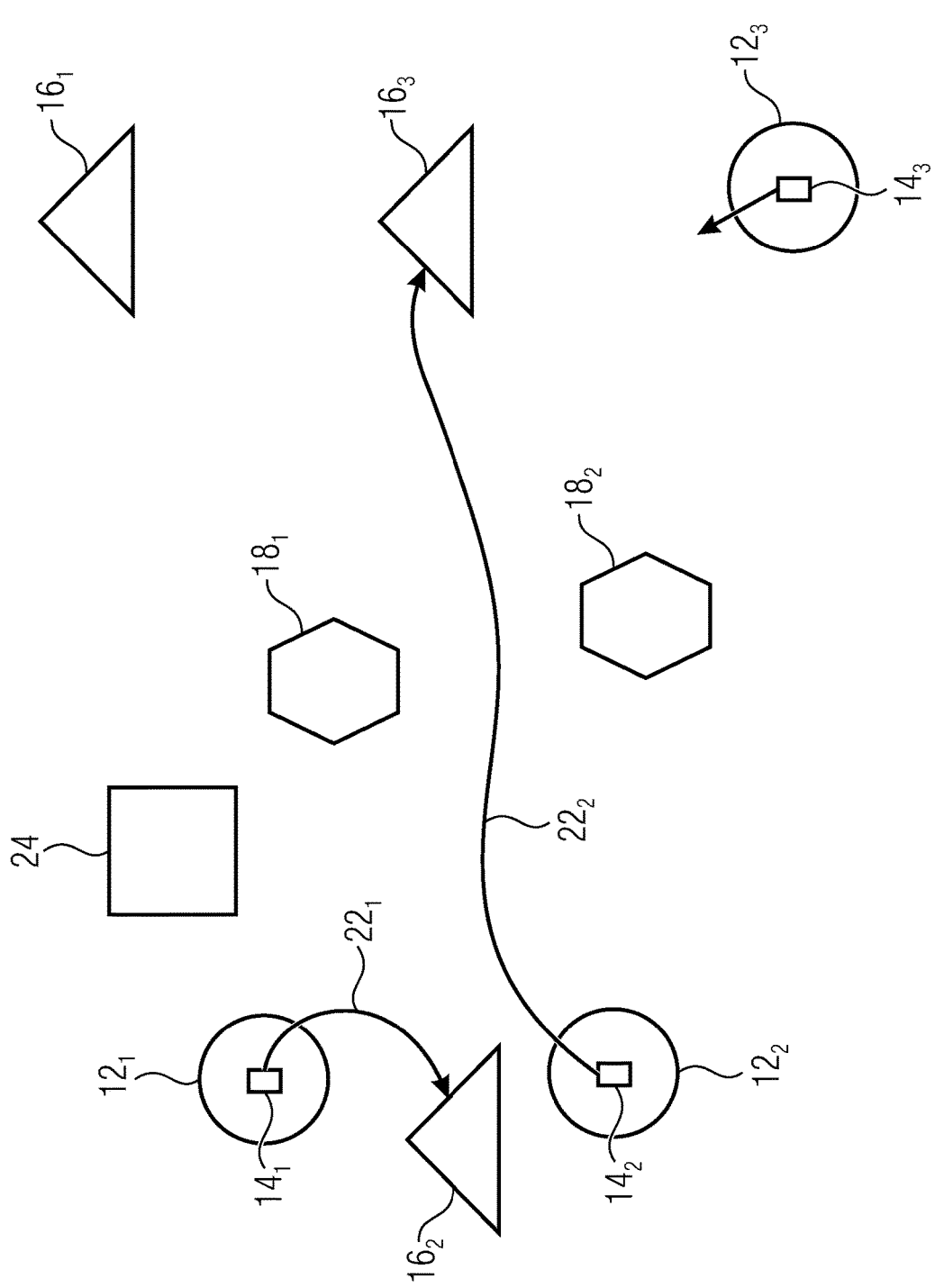
FIG. 1a is a schematic block diagram of a sorting system according to an embodiment.

Before embodiments of the present invention will be explained below in detail with reference to the drawings, it is pointed out that identical elements, objects and/or structures or those of the same function or acting in the same way are provided with the same reference numerals in the different figures, so that the description of these elements shown in different embodiments is interchangeable or mutually applicable.

Embodiments described below are described in the context of a variety of details. However, embodiments may be implemented without these detailed features. Furthermore, for the sake of clarity, embodiments are described using block diagrams as a substitute for a detailed representation. Furthermore, details and/or features of individual embodiments can easily be combined with each other, as long as it is not explicitly described to the contrary.

The embodiments described herein refer to a sorting system and a corresponding method. Unlike known sorting systems in which, for example, as in the case of tilt tray sorters or a conveyor belt sorter, the distribution of sorting goods or load pieces takes place on predefined, mechanically set up ring-shaped or linear paths and/or unlike automatic vehicles in which there is a fixed grid of paths on which vehicles can then move, a control device in connection with sorting systems described herein is configured in such a way that routes of vehicles can be dynamically variable, for instance if this is entailed due to variable arrangements of individual objects in the sorting system and/or in that a vehicle of vehicles in the sorting system is variable. Such a control device may be located centrally and communicate with the vehicles for example by means of wireless communication, such as Bluetooth, WLAN, 4G, 5G or the like, or by other means. Alternatively or additionally, a control device can also be implemented in a fully or partially distributed manner in the vehicles, so that a corresponding route and/or driving behavior is determined locally.

While in known sorting systems, for example as described for the tilt tray sorter with fixed infrastructure, obstacles are not expected from the tilt trays along the predefined, mechanically set up routes, so that it would not have to react to such obstacles, other known systems with automatic vehicles are configured to be able to react to a sudden obstacle on the fixed routes, for example by stopping, slowing down or aborting the journey, or by taking a detour. An example of such a scenario is an obstacle, such as an object or a human, entering the path of travel.

Embodiments are also directed to moving vehicles at comparatively high speeds, which makes it difficult or even impossible to detour or stop the vehicle before a collision, for example due to physical boundary conditions such as mass inertia. In this respect, embodiments are directed at performing dynamic route planning that detects collisions in advance and plans the route accordingly to avoid the need for a sudden detour or braking.

Embodiments refer to a sorting system having insertion points or insertion locations and terminal points. A terminal point can be understood to be a point in the sorting system at which the sorting good is taken out of the sorting system again or discharged, but it can also be a transfer point from which, after the first partial transport has taken place, a further partial transport to a further terminal point or transfer station takes place by picking up the sorting good again with a sorting vehicle, which is why a terminal point can serve synonymously as a transfer station in some embodiments and/or a transfer station can be regarded to be a terminal point for a partial transport. Both facilities, the terminal station and the transfer stations, may be understood to be sorting good transfer stations. Nevertheless, such a sorting good transfer station can also be understood to be an insertion point, in that the sorting good is again made available for a journey.

In this regard, FIG. 1a shows a schematic block diagram of a sorting system 100 according to an embodiment. The sorting system 100 comprises a first number of insertion points $12_1$ to $12_3$, which are configured to provide sorting goods $14_1$ to $14_3$, i.e. to introduce them into the sorting system, to distribute them further and/or to make them available for transport.

The sorting system further comprises an equal or different number of terminal points $16_1$ to $16_3$, configured to receive the sorting goods $14_1$ to $14_3$.

Furthermore, the sorting system 100 comprises a number of driverless sorting vehicles $18_1$ and $18_2$, which, in terms of numbers, may be the same as or different from the number of insertion points 12 and/or the number of terminal points 16, and which are configured to transport the sorting goods $14_1$ to $14_3$ between the insertion points $12_1$ to $12_3$ and the terminal points $16_1$ to $16_3$. For this purpose, for example, at least one of the sorting vehicles 18 can transport at least one sorting good 14 in accordance with a travel order along a route or trajectory $22_1$ or $22_2$, where the term route or trajectory can mean a completely or partially straight course of the distance covered alternatively to or in combination with an at least partially curved course of the route.

The sorting system 100 further comprises a control device 24 configured to control the driverless sorting vehicles $18_1$ and/or $18_2$ between the insertion points 12 and the terminal points 16.

Advantageously, the driverless sorting vehicles are equipped with an omnidirectional drive system. Such vehicles can also be referred to as holonomic vehicles. This means that the number of controllable degrees of freedom can be equal to the total number of degrees of freedom present in the system. A holonomic vehicle or holonomic robot can be understood to be a device capable of traversing any trajectory in the so-called configuration space, which effectively means the space formed by the exemplary three degrees of freedom with the positions X, Y and the rotation, as long as the boundary condition of acceleration is met. This is in contrast to, for example, vehicles such as an automobile, which is normally unable to drive sideways into a parking space. For such parking, relatively complicated trajectories are chosen to move the vehicle 2 meters sideways, for example, because the automobile has only two controllable degrees of freedom. For this purpose, it is assumed that systems of vehicles driving on the ground have a total of three degrees of freedom, namely the two for the positions X and Y and one for rotation.

Several concepts are possible for implementing a so-called omnidirectional drive system, with embodiments being directed in particular to vehicles whose drive systems comprise omniwheels and/or mecanum wheels, which have good properties for moving a vehicle. One difference between omniwheels and mecanum wheels, for example, is that omniwheels can absorb little or no lateral forces when viewed in the direction of travel, whereas mecanum wheels can. Regardless of this, the same or similar kinematics can be realized with mecanum wheels as with omniwheels, resulting in good usability of both devices.

Figure 1B:
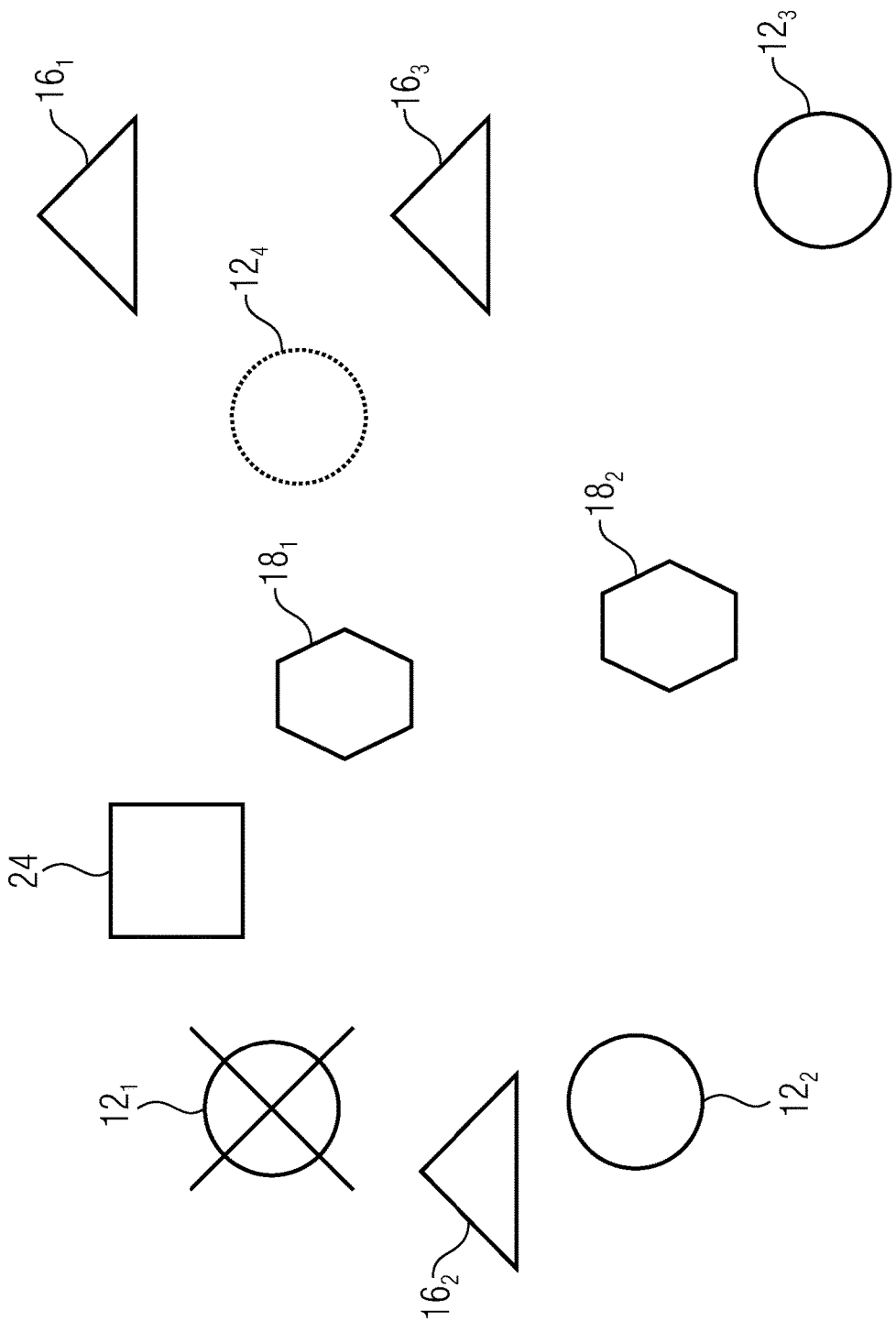
FIG. 1b is a schematic block diagram of a sorting system modified from the sorting system in FIG. 1a, according to an embodiment.

FIG. 1b shows a schematic block diagram of a sorting system 100' modified from the sorting system 100 shown in FIG. 1a, for example by adding an additional insertion point $12_4$ to the sorting system 100 and/or by removing an existing insertion point, such as the insertion point $12_1$. As will be described in further detail below, while some type of physical facility may be provided or implemented at an insertion point 12, this is not necessarily required since an insertion point, like a terminal point, may already be operated as a defined area or space from which sorting goods are received or into which sorting goods are delivered. In one example, an insertion point and/or a terminal point is configured as a mechanically passive rack at which a sorting vehicle 18 can discharge and/or pick up a transported sorting good. By removing such a device, a terminal point can be put out of operation. Alternatively, by additionally placing such a device, a corresponding point in the sorting system may additionally be put into operation, and in both cases the control device 24 is configured to adjust the control of the sorting system accordingly, for example by adjusting the routes or trajectories 22. Combinatorially, it is also possible, for example, to relocate the insertion point $12_1$ in order to reach the insertion point $12_4$.

The aforementioned changes can be made ad-hoc, for example, i.e. during ongoing operation. Appropriate signaling to the control device 24 to adjust the existing control may be sufficient to continue operation of the sorting system 100 or 100', respectively, without disturbance.

The described redesign of the sorting system with regard to the insertion points can easily be carried out for the end stations 16 as well.

The sorting system 100 and/or the sorting system 100' can, for example, be operated as a decentralized sorting system, in which the insertion points 12 and/or the terminal points 16 can be arranged in a decentralized manner in the sorting system. Decentralized insertion points may be understood, for example, to be a configuration in which at least two insertion points 12 are arranged such that a distance therebetween is greater than to a respective closest terminal point. This can also be considered complementarily for decentralized terminal points.

It should also be noted at this point that the term insertion point or terminal point does not necessarily mean an initial entry into or final exit from the sorting system. Rather, a terminal point can also be configured to pass on a sorting good after it has been received, for example to another sorting good. In an equally significant manner, an insertion point 12 may also already receive the sorting good from a sorting vehicle. Exemplary implementations of such combinations are, for example, transfer points in a sorting system, such as at junctions of two warehouses or the like.

Optionally, additional devices may also be arranged in the sorting system 100 or 100', for example, tools and/or devices for identification, i.e. an identification device. Such an identification device may be configured to perform an identification of a sorting vehicle and/or a sorting good. For example, an identification device may comprise a camera configured to detect recognition features of the object to be recognized, such as a shape, a pattern arranged therein or the like, or other characteristics. Alternatively or additionally, other means of identification may be provided, for example using radio technology, such as by means of RFID (radio-frequency identification). Independently, at least one of a number or positioning of an insertion point 12, a termination point 16, and/or such an identification device may be variable. The control device 24 may be configured to account for such a change, for example in route planning.

Figure 2:
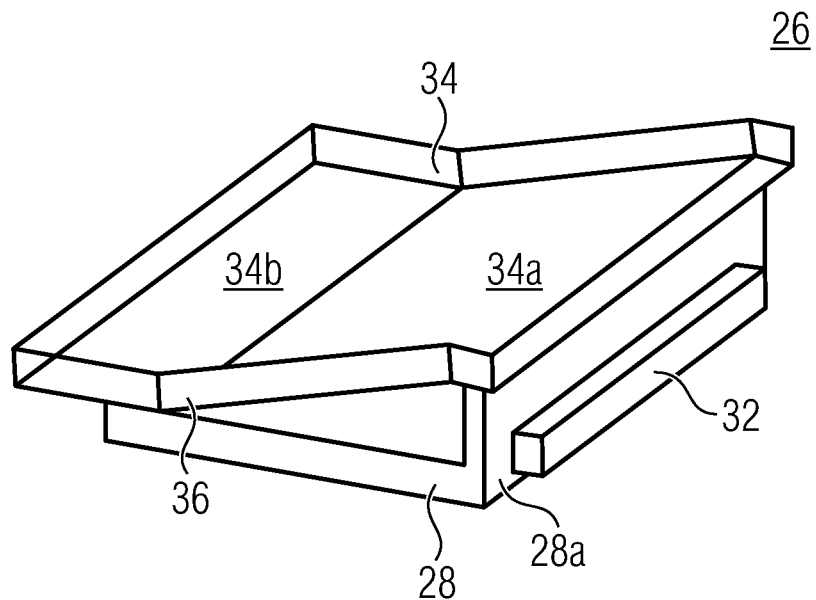
FIG. 2 is a schematic perspective view of a sorting good transfer station according to an embodiment.

FIG. 2 shows a schematic perspective view of a sorting good transfer station 26 according to an embodiment, which can be used, for example, as a terminal point 16 and/or for re-sorting or re-distribution as an insertion point 12. The sorting good transfer station 26 may have a base 28 comprising a front side 12a, on which a shock absorber and/or spring element 32 (bumper) may be arranged. A receiving area 34 is arranged on the base 28 of the sorting good transfer station 26, which is exemplarily formed from an angle profile, which receiving area 34 can be open at the front side 28a of the base 28 and can otherwise advantageously have side edges 36 in order to limit the movement space of a sorting good. In the illustrated embodiment, the bottom surface of the receiving area 34 is initially sloped, this area being designated by 34a, and the rear area is, for example, horizontal or less sloped and designated by 34b.

Figure 3:
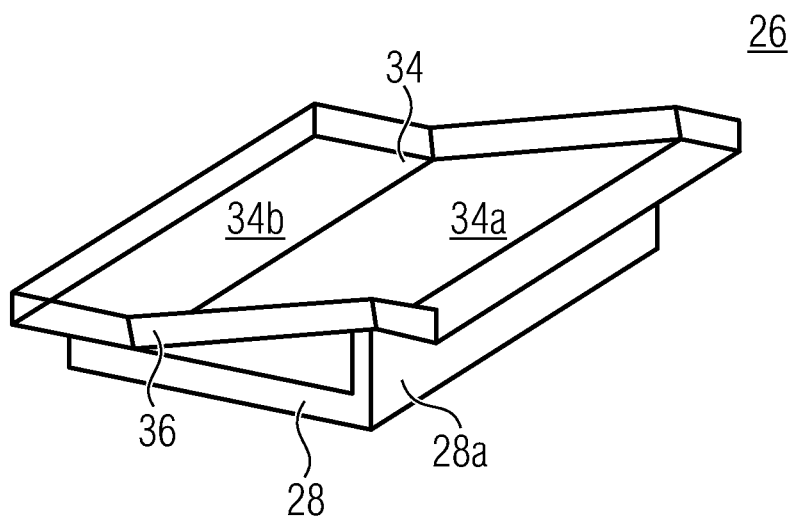
FIG. 3 is a schematic perspective view of an alternative layer transfer station according to an embodiment.

FIG. 3 shows a schematic perspective view of an alternative sorting good transfer station 26, which differs from that according to FIG. 2 in that no shock absorber element and/or spring element 32 is provided.

The sorting good transfer station 26 illustrates only one of the advantageous implementations of an insertion point or terminal point. Thus, it can be recognized that in the receiving area 34a, when a sorting vehicle 18 is approaching, possibly at high speed to take advantage of mass inertia, the sorting goods 14 can reach the receiving area 34, possibly slide down and can be picked up again from the area 34b. However, the area 34b can also be implemented, for example, in the same way as the receiving area 34a, on a floor surface on which the sorting good 14 is placed or from which it is picked up.

Figure 4A:
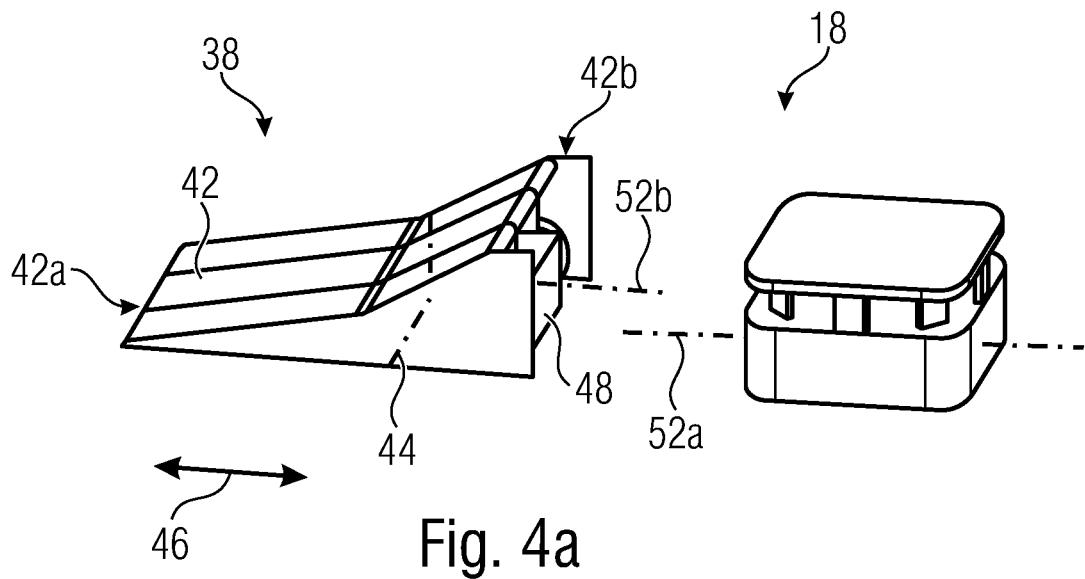
FIG. 4a is a schematic perspective view of a sorting vehicle according to an embodiment, which may be adjacent to a tool in the sorting system.

The sorting good transfer station 26 may also be considered to be a tool, meaning that at least one of the insertion points 12 may include a tool configured to receive a sorting good. FIG. 4a shows a schematic perspective view of a sorting vehicle 18 according to an embodiment, which may be adjacent to a tool 38 in the sorting system 100. The tool 38 may include one or more devices 42 for conveying a sorting good, for example by performing a movement upward or downward, or from a first area 42a to a second area 42b, or in the other direction. The tool 38 may be formed to be stationary or mobile. For example, a running gear may be rotatably mounted about an axis 44 so that the tool may be movable along a direction of movement 46.

The sorting vehicle 18 may include an interface configured to be coupled to the tool 38, i.e. to receive the tool 38 based on coupling. Exemplarily, the coupling may be of a mechanical design, for example by latching, a threaded connection, a bayonet connection, by hooking, or the like, but may also use other principles, for example, magnetic coupling. The tool 38 may have a corresponding interface to be coupled to the sorting vehicle 18.

For example, with the axes of movement 52a of the sorting vehicle 18 and 52b of the tool 38 at least parallel, but advantageously matching, the coupling can be executed when the sorting vehicle 18 approaches the tool 38. For example, the tool 38 may be configured to pick up a sorting good 14, such as from a floor surface or the sorting good transfer stations explained in connection with FIGS. 2 and 3. For example, the vehicle 18 coupled to the tool 38 in FIG. 4b may approach a sorting good $14_1$ and/or $14_2$ to pick it up, for example in the area 42a, so that the tool 38 may transport the sorting good $14_1$ or $14_2$ onto a sorting good receiving area 54 of the sorting vehicle 18. Optionally, it may be provided that in order to support the sorting good reception, the sorting vehicle 18 moves against a possibly stationary or at least weighty obstacle so that the sorting good $14_1$ or $14_2$ is pushed onto the area 42a of the tool 38. Alternatively or additionally, it is possible for the control device 24 to control another sorting vehicle such that it pushes a sorting good onto the area 42a. Reversing a direction of conveyance of the conveyor belt may also cause transport from the sorting good receiving area 54 toward the area 42a, such as by sharply decelerating the sorting vehicle 18 or the like.

After the sorting good has been picked up or discharged, the vehicle 18 may decouple from the tool 38 and may, for example, leave the tool 38 behind. The tool 38 may be positioned or left behind at an insertion point 18, or may even define this insertion point. This also results in dynamic positioning of an insertion point, such as when the tool 38 may be left at a variable location.

The above explanations are readily applicable to other tools, for example, a gripper for gripping a sorting good, a trailer which can provide an additional surface for load carrying and can be pulled by a sorting vehicle 18 or other trailer to a device for identification or the like. That is, a sorting system according to an embodiment is configured to provide, at or adjacent to an insertion point and/or a terminal point and/or other location, a tool intended for identification of a sorting good for pickup or coupling by a sorting vehicle. This also results in the possibility that one of said tools is transported to another location by a sorting vehicle, for example, to be used there, as an alternative or in addition to being used by a sorting vehicle.

Figure 4B:
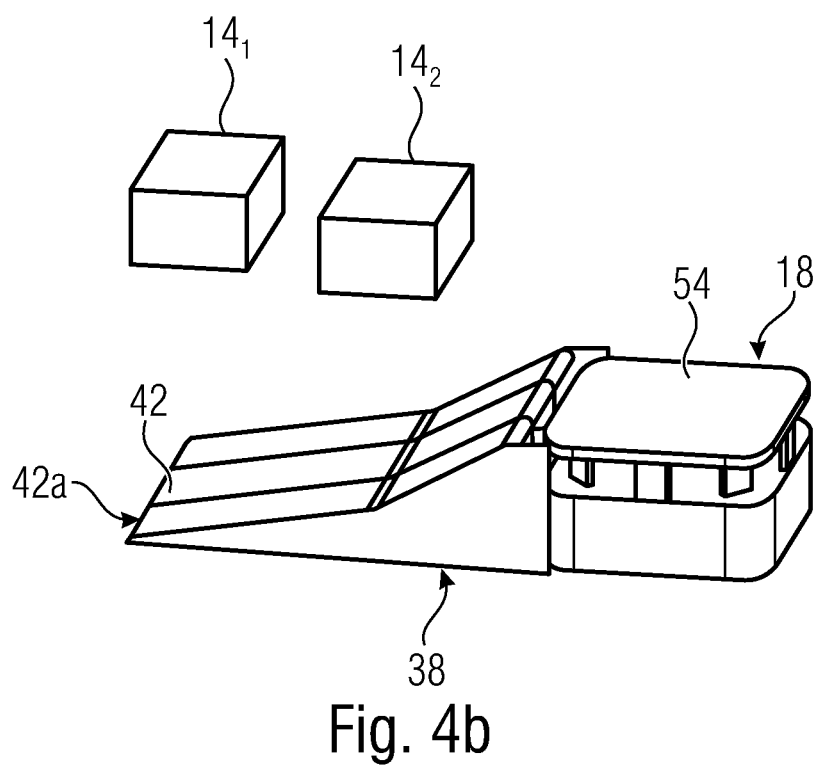
FIG. 4b shows a state of the vehicle of FIG. 4a, which is coupled to the tool according to an embodiment.

With reference to the explanations in connection with FIG. 4a and FIG. 4b, an insertion point of a sorting system described herein may be configured to transfer the sorting good to a sorting vehicle 18 using the tool 38 or another tool suitable for this. According to an embodiment, the insertion point is configured to receive the sorting good 14 from a floor surface and/or to transfer the sorting good to at least one of a sorting vehicle, a transfer station of the sorting system, and a storage volume, such as a rolling container or the like. Another use of the tool 38 is, for example, receiving a sorting good that has fallen onto the floor surface using the tool 38, which may be done in an area of the insertion point but also at another location. Thus, some embodiments provide for forming ad-hoc insertion points comprising mobile tools in combination with the sorting vehicles, i.e., a sorting vehicle, controlled by the vehicle controller and/or the sorting system control device, may use a mobile tool to provide an ad-hoc insertion point at which sorting good, such as parcels, may be picked up from the floor. For this purpose, a control function of the sorting good system may be set up to control the insertion point and/or the sorting vehicle accordingly. Determining that a sorting good is located on the floor surface, for example due to a fault in the sorting system or an accidental drop, can be made, for example, by mobile or stationary detection devices, such as a camera system. A stationary camera system may comprise at least one camera arranged, for example, at an elevated position, such as on a pole or a ceiling of a room, to monitor at least a partial area of the floor surface. A mobile camera system, which may be arranged as an alternative to or in addition to a stationary camera system, may comprise, for example, at least one camera arranged on a sorting vehicle or other ground or air vehicle, configured to detect the floor area. Drones, for example, may be suitable for this purpose.

Thus, embodiments provide a sorting system comprising a tool configured to receive a sorting good and/or to enable identification of a sorting good, and configured to be coupled to the interface of the vehicle, wherein the coupling may, for example, be mechanical and/or magnetic.

According to an embodiment, at least one of the sorting vehicles is configured to perform coupling with the provided tool, to use the tool to pick up the sorting good, to decouple the tool thereafter, and to leave the tool at a drop-off location or deposit location.

According to an embodiment, at least one sorting vehicle is configured to receive a tool intended for identification of a sorting good, and to use the tool for identification of a sorting good. Based on the identification, a destination of the sorting good can be determined, wherein the vehicle can be configured to determine a destination of the sorting good based on the identification, for example via corresponding data stored in or at least accessible to the sorting vehicle. Alternatively or additionally, a result of the identification can be transmitted to the sorting system, which can enable a destination determination at another device of the sorting system.

According to an embodiment, at least one sorting vehicle is configured to receive and transport a tool intended for identification of a sorting good. This makes it possible, for example, to provide a small number of a corresponding identification tool in the sorting system and to transport it to a required position or area by means of a sorting vehicle.

As described in connection with FIGS. 4a and 4b, a sorting vehicle may be configured to pick up a sorting good from a floor surface. For this purpose, the sorting vehicle may comprise corresponding elements or tools, or, as shown in FIGS. 4a and 4b, may be configured to at least temporarily provide coupling with a tool, such as the tool 38, in particular a belt conveyor device, in order to pick up the sorting good using the tool.

Figure 5:
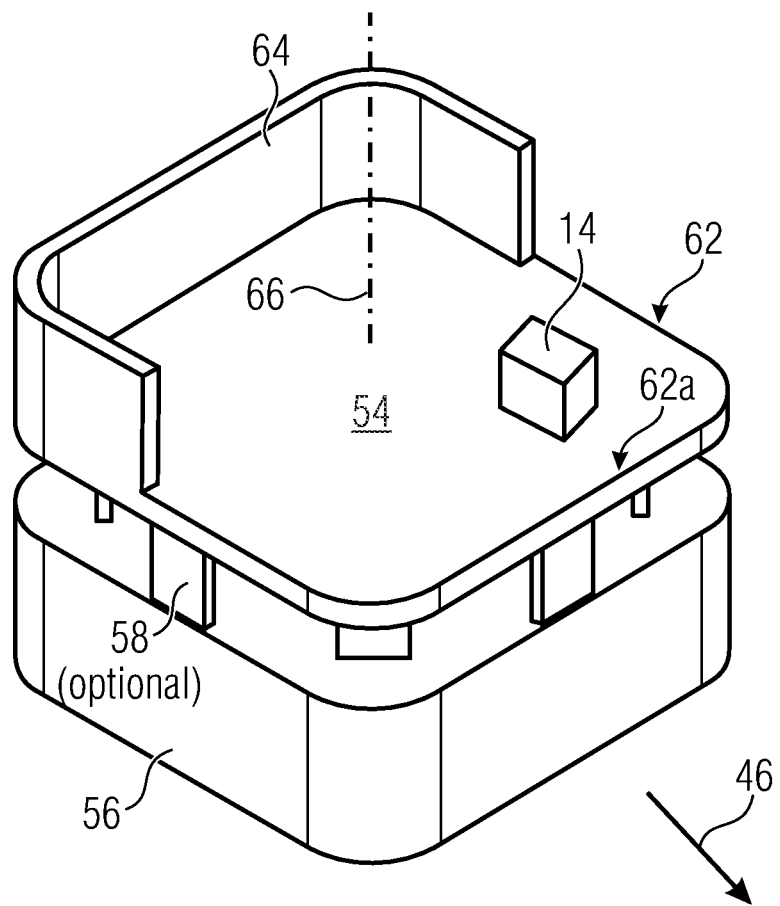
FIG. 5 is a schematic perspective view of a possible implementation of one or more sorting vehicles according to an embodiment with an omnidirectional running gear.

FIG. 5 shows a schematic perspective view of a possible implementation of one or more sorting vehicles 18 according to an embodiment. The sorting vehicle 18 may include a chassis or running gear 56, such as an omnidirectional running gear. A transport area 62, which may provide the sorting good receiving area 54, may be disposed on an optional intermediate body 58, such as spacer studs or the like. For example, the sorting good receiving area 54 may be partially bounded by a retaining area or boundary area 64 over which slipping out or sliding out of a sorting good is impeded or prevented.

At unbounded areas of the sorting good receiving area 54, on the other hand, sliding out of a sorting good 14 may be possible, of advantage or even desirable. Such a sorting vehicle with the sorting good receiving area 54, which is arranged on the running gear 56, wherein the sorting good receiving area or the transport area 62 can have a retaining element, the retaining area 64, securing the sorting good at the edge thereof, can be controlled by means of a control device or vehicle control, for example locally or centrally, by the control device 24, in such a way that the vehicle controller aligns the retaining area 64 on the basis of an actual or expected acceleration or delay (negative acceleration) of the running gear 56 with respect to the current direction of travel about a vertical axis 66 such that the retaining area 64 is located at least on that side of the transport area 62 or of the sorting good receiving area 54 towards which the sorting good moves after overcoming static friction between the surface of the sorting good receiving area 54 and the contact surface of the sorting good. For example, rotation about the vertical axis 66 can be provided by means of the omnidirectional drive system in the running gear 56. If there is a possibility, probability, or the like, due to the acceleration or delay of the vehicle, that the sorting good would slide beyond the open area of the transport area 62, a rotation of the vehicle can be provided while at the same time maintaining the trajectory of movement of the vehicle in the sorting system.

Sorting vehicles in embodiments described herein may have a load receiving device for receiving the sorting good and a load discharge device for discharging the sorting good. This may be a tool and/or a mechanical device and/or a vehicle controller which, for example, causes abrupt braking to discharge the sorting good in order to cause the sorting good to slide in order to cause the sorting good to be discharged. Braking is advantageously triggered when approaching a terminal point or a transfer point in order to discharge the sorting good there. The load receiving device and the load discharge device can thus also be provided by different use of an identical mechanical and/or software-implemented device.

Looking at the sorting vehicle 18 of FIG. 5, it is clear that if an abrupt delay occurs during a travel along the direction of movement 46, a schematically shown sorting good 14 could slide out over an edge 62a relative to the sorting vehicle 18. While moving, the vehicle controller may be arranged to prevent this from occurring by means of rotational movement of the vehicle. However, it may also be desired to use or even provoke precisely this slipping out, for example for discharge of the sorting good, for example at the sorting good transfer station 26 of FIGS. 2 and/or 3. Thus, for example, a movement of the sorting vehicle 18 can be carried out in such a way that the edge 62a is moved towards the region 34a of the sorting good transfer station and, for example, by means of a running gear controller and/or with the aid of the spring element 32, which may alternatively or additionally also be arranged on the vehicle, the abrupt delay is produced.

Figure 6:
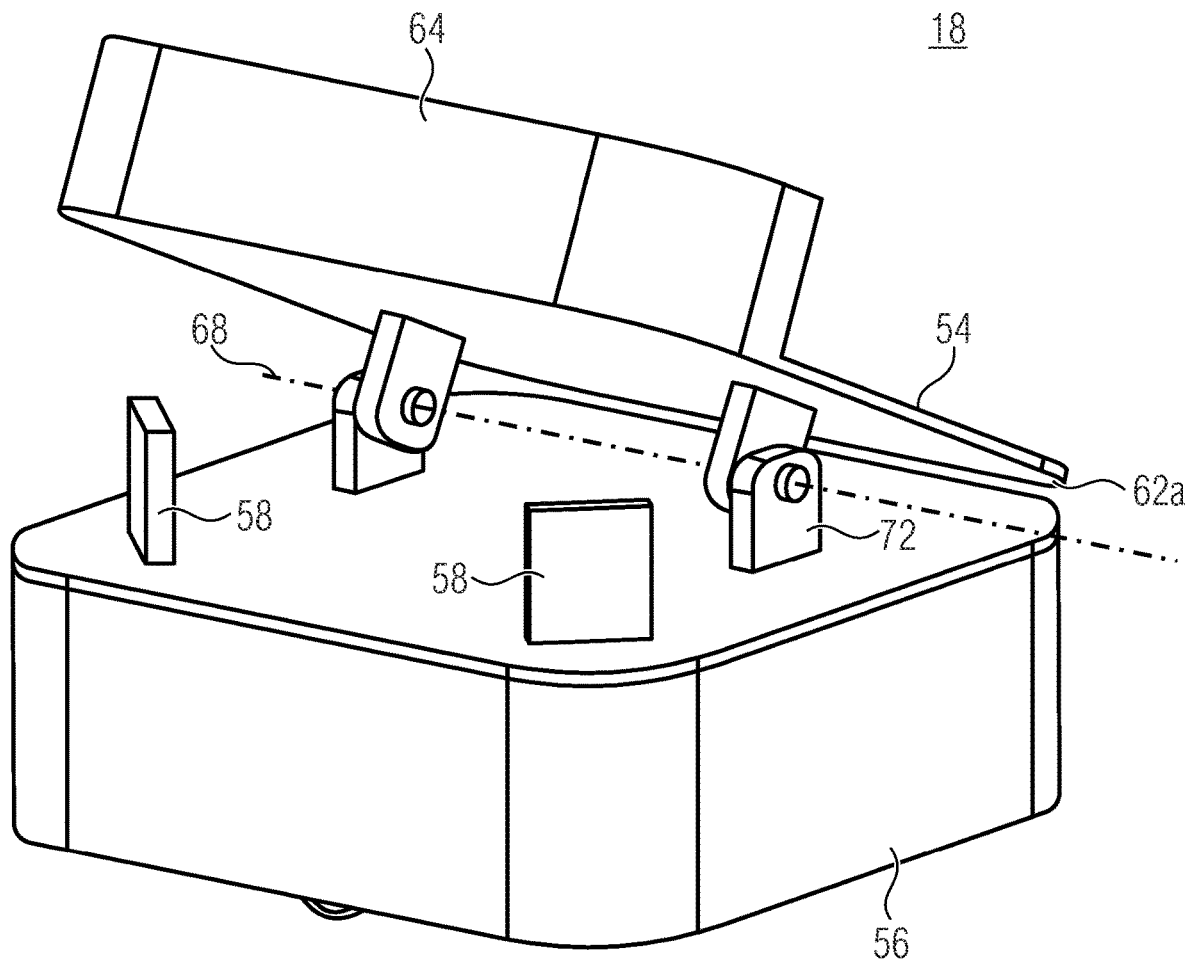
FIG. 6 is a schematic perspective view of a sorting vehicle according to an embodiment with folding tray.

With reference to FIG. 6, which shows a schematic perspective view of a sorting vehicle 18 with a folding tray, an aspect is to be highlighted that can be implemented alternatively or in addition to other transfer mechanisms of embodiments described herein. For example, based on the illustration of FIG. 5, the transport area 62 may be mounted tiltably so that the sorting good receiver is coupled to the chassis and the running gear therein for transporting sorting good and transferring the sorting good to a sorting good transfer station. The running gear is coupled to a drive unit, such as the omnidirectional drive units. A vehicle controller of the sorting vehicle 14 is configured to tiltably deflect the sorting good receiver about a tilt axis 68 on the chassis. For this purpose, for example, a tilt bearing 72 may be provided to provide the tilt axis 68. Several such tilt bearings 72 can be combined with one another, for example to provide tilting along different directions. By means of mechanical implementation, a force required to trigger tilting of the sorting good receiving area 54 can be set. Although the sorting vehicle of FIG. 6 is shown with at least one area excluded from the retaining area 64, the retaining area 64 may also be removable and temporarily present, for example via an actively controllable folding mechanism or other active means.

The tilt axis 68 may be aligned to coincide with a discharge edge 62a such that when the sorting good receiving area 54 is in a tilted positioning, the sorting good may be transferred over the discharge edge 62a to the sorting good transfer station, i.e. slides down, or moved otherwise. To transfer the sorting good to the sorting good transfer station, the sorting good receiving means may be tilted about the tilt axis 68 by a change in the speed vector, such as rapid deceleration or, alternatively, rapid delay of the sorting vehicle 14. It is also possible, alternatively or in addition to a change in vector length or a change in speed, for the vehicle control system and/or a central instance of the control device 24 of the sorting system to change a direction of the speed vector, for example to trigger a sudden change in direction or cornering of the sorting vehicle 18, which can also enable a transfer to take place, since the inertial forces on the sorting good receptacle resulting therefrom can trigger tilting of the same about the tilting axis 68. Such control is also possible with a tiltable transport region 62 and without such a tilt axis 68. Even without a tilt axis 68, a change in the speed vector can be used to cause intentional sliding down of the sorting good from the tiltable or non-tiltable transport section 62. Embodiments also provide for a combination of these solutions, in that a sorting vehicle has a tiltable transport region 62, but the sorting vehicle 18 is controlled in at least some transfer situations such that the transport region does not tilt, but the sorting good nevertheless slides off the transport region 62, for example, due to a change in direction and/or a corresponding orientation of the tilt axis 68 with respect to the speed vector. This allows the sorting vehicle to be used with different implementations of transfer stations.

Figure 7:
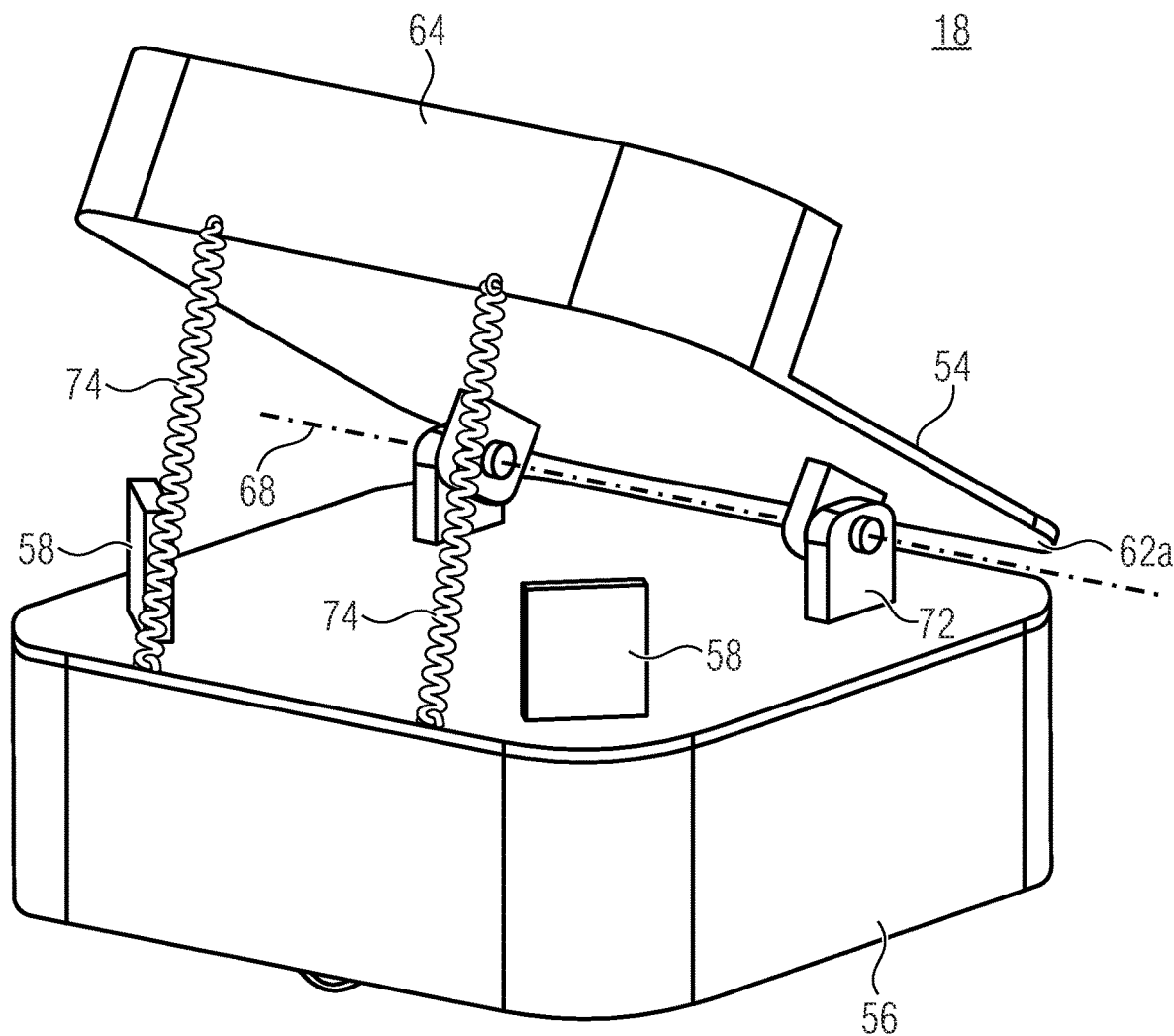
FIG. 7 is a representation corresponding to FIG. 6, in which spring loading by means of one or more spring elements is additionally set up according to an embodiment.

FIG. 7 shows a corresponding illustration, in which additionally spring loading is set up by means of one or more spring elements 74, whereby the one or more spring elements 74 can support the tilting process (for example in case of an implementation as compression spring), or can increase a required force, for example in case of an implementation as tension spring. That is, spring loading of the sorting good receiver can be used to generate torque to provide tilting about the tilt axis.

Regardless of an implementation with or without spring elements and/or regardless of whether the transport area 62 is tiltable, a sorting vehicle may thus be configured to discharge the sorting good 14 using kinetic energy of the sorting good provided by a travel movement of the sorting vehicle, for example, by braking the vehicle, and inertias of the sorting good 14 leading to a relative movement of the sorting good with respect to the vehicle so that the sorting good 14 is discharged. Such deceleration may also result in a change in the speed vector which may cause the discharge.

According to an embodiment, a driverless sorting vehicle, such as for use in sorting systems described herein, may be configured to include a drive device and a control device for controlling the drive device. The control device is configured to control the drive device for braking the driverless sorting vehicle before reaching the terminal point 16 in order to discharge the sorting good 14 to a terminal point 16, in order to generate a relative movement of the sorting good 14 with respect to the driverless sorting vehicle by means of the braking and/or targeted cornering under the influence of the kinetic energy; in order to effect the discharge to the terminal point 16 by means of the relative movement. Thus, by means of braking and/or cornering in the drive device for changing the vector of the speed, sliding down of the sorting good from the sorting vehicle and/or a tilting movement of a tilting tray can be triggered.

Alternatively or additionally, the control device 24 and/or the local controller of the vehicle can be configured to control the drive device for an impact of the driverless sorting vehicle against a contact area of the terminal point 16 for a discharge of the sorting good 14 to a terminal point 16, in order to generate a relative movement of the sorting good 14 with respect to the driverless sorting vehicle by means of the impact under the influence of the kinetic energy; in order to effect the discharge to the terminal point 16 by means of the relative movement. Thus, by means of braking by the impact, sliding down of the sorting good from the sorting vehicle and/or a tilting movement of a tilting tray can be triggered. This can shorten a braking distance compared to braking in the drive train, but this can lead to higher mechanical loads. On the other hand, a more powerful deceleration can be enabled compared to a control in the drive system, which can enable an even more effective inertia-based transfer. In other words, the mechanical impact can increase the mechanical constraint, i.e., the impact, the instantaneous negative acceleration of the sorting vehicle to a value that can be significantly greater than by braking alone. This also allows large frictional forces between the loaded goods and the load receiver to be overcome, because the inertial force of the loaded goods (relative to the area of the load receiver) is stronger due to the strong deceleration of the sorting vehicle. For this purpose, embodiments provide that the transfer station and/or the sorting vehicle has mechanical bumpers, and the controller of the sorting system and/or the sorting vehicle is set up to control the vehicle in such a way that the impact occurs at such a bumper.

Such an impact can easily be combined by braking in the drive unit to obtain an optimum of short braking distance on the one hand and low mechanical loads on the other.

Figure 8A:
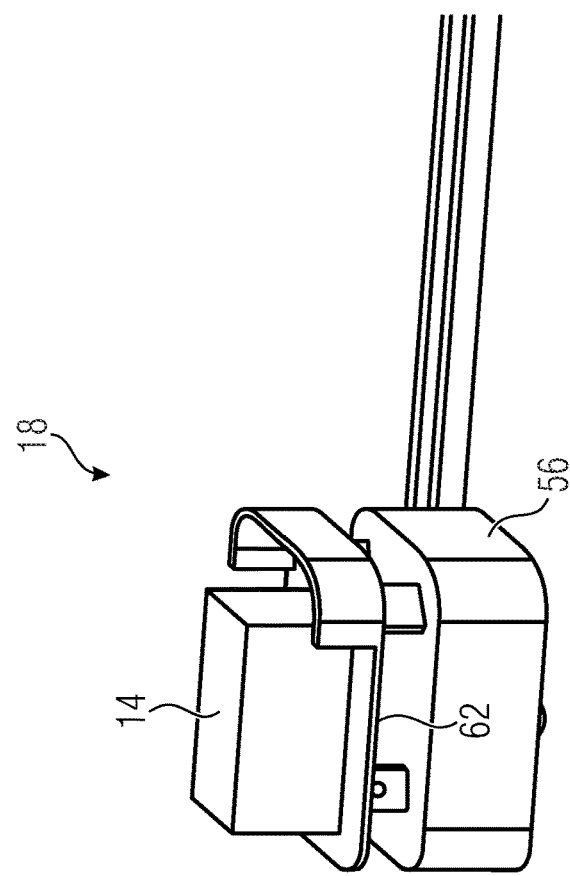
FIG. 8a is a schematic perspective view of a condition during an approach of a sorting vehicle according to an embodiment to the sorting good transfer station of FIG. 2.
Figure 8A:
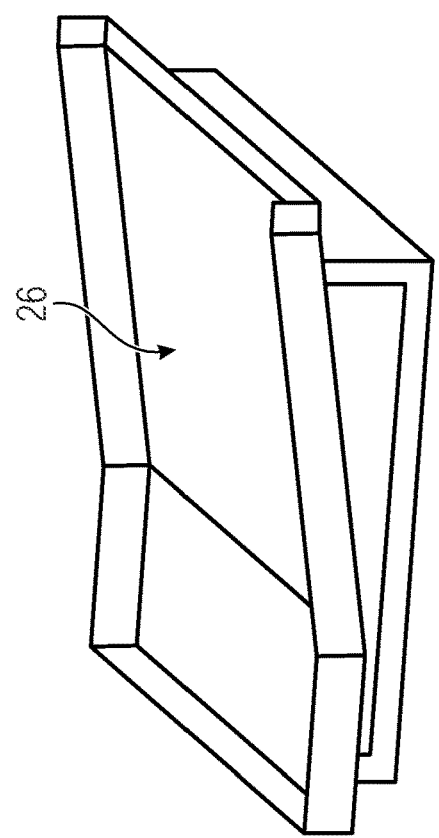
Figure 8B:
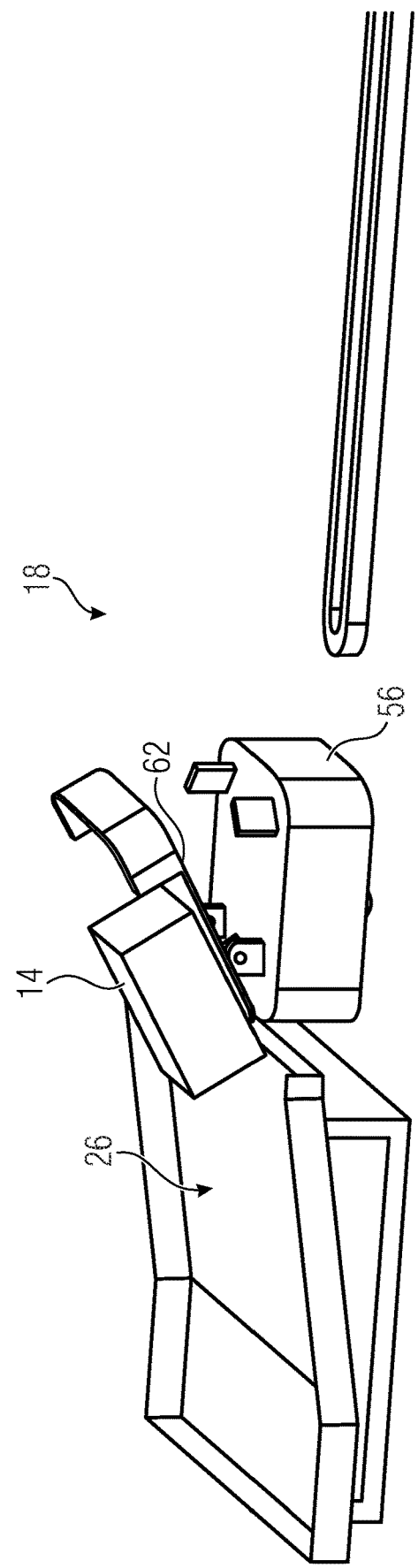
FIG. 8b is a schematic representation of a situation based on FIG. 8a, in which the sorting vehicle has approached the sorting good transfer station and brakes according to an embodiment.

According to an embodiment that can be combined with both the braking in the drive train and the induced impact, the driverless sorting vehicle 18 can comprise a sorting good receiver which is arranged movably, for example tiltably, relative to a chassis of the driverless sorting vehicle coupled to the drive device, and the relative movement comprises a movement of the sorting good 14 in the sorting good receiver relative to the chassis, as shown, for example, in FIG. 6, 7 or 8*b*.

A driverless sorting vehicle 18 of the sorting system may have the sorting good receiver 54 bounded in part by the retaining area 64, which is configured to at least impede a sorting good 14 from slipping or sliding out, as described in connection with embodiments. The control device 24 or the control device 86 of the sorting vehicle may be configured to position the retaining area 64 as a transport restraint for the sorting good 14 during travel of the driverless sorting vehicle 18. This may be used to position the retaining area 64 opposite the direction of the inertial force being experienced or expected to be experienced, in order to implement the transport safeguard. This may be based on the current speed vector of the vehicle and/or an expected change in the speed vector of the sorting vehicle, i.e., an acceleration or delay or change in direction of the running gear. An expected change in the speed vector may be expected in the future, for example, based on an at least partially pre-known trajectory in which the sorting vehicle 18 is steered i.e. expected to be driven.

Furthermore, embodiments provide for controlling the sorting vehicle 18 to turn or change direction for transfer, in particular for discharge, of the sorting good 14 in at least some situations. The sorting system may be configured for local and/or central control of the sorting vehicle 18 to move the retaining area 64 in a position or orientation prior to the effected transfer such that the retaining area 64 does not further impede the discharge, such as when it is positioned in the meantime as a transport safeguard following the speed vector.

FIG. 8*a* shows a schematic perspective view of a condition during an approach of a described sorting vehicle 18 to the sorting good transfer station 26. The sorting good 14 is arranged in the transport area 62 or sorting good receiving area 54, as an example.

In the situation shown in FIG. 8*b*, which may result from the situation shown in FIG. 8*a*, the sorting vehicle 18 has approached the sorting good transfer station 26 and brakes, causing the transport area 62 to tilt, which may cause the sorting good 14 to slide down onto the sorting good transfer station 26.

In embodiments, at least one terminal point is defined by an installed infrastructure, for example as an access for a rolling container, an additional conveyor belt or the like. Alternatively or additionally, at least one terminal point may be defined by time-varying objects and/or time-varying positions in a sorting system layout, and may be independent of an infrastructure, for example. For example, a structure explained in connection with FIG. 15 may be movable in space to implement an insertion point, a transfer point, and/or a terminal point. Displacement of such a structure may result in a variable layout. According to other embodiments, a terminal point may also already be defined by a corresponding surface on which the sorting good is placed.

According to an embodiment, the at least one terminal point comprises an electrically passive chute device having a flat or inclined sloping surface that has a buffer function for a plurality of sorting goods. For example, it is clear from the illustration of FIG. 2 and/or the illustration of FIG. 3 that a plurality of sorting articles 14 may also be deposited at the sorting good transfer station 26. According to an embodiment, the terminal point has an electrically passive chute device and has a flat or inclined surface that includes a deceleration device, such as that shown in FIG. 2, for example, see spring element 32. The deceleration device may be configured to decelerate an approaching sorting vehicle, thereby enabling an inertia-based transfer of the sorting good to the chute device.

Figure 9B:
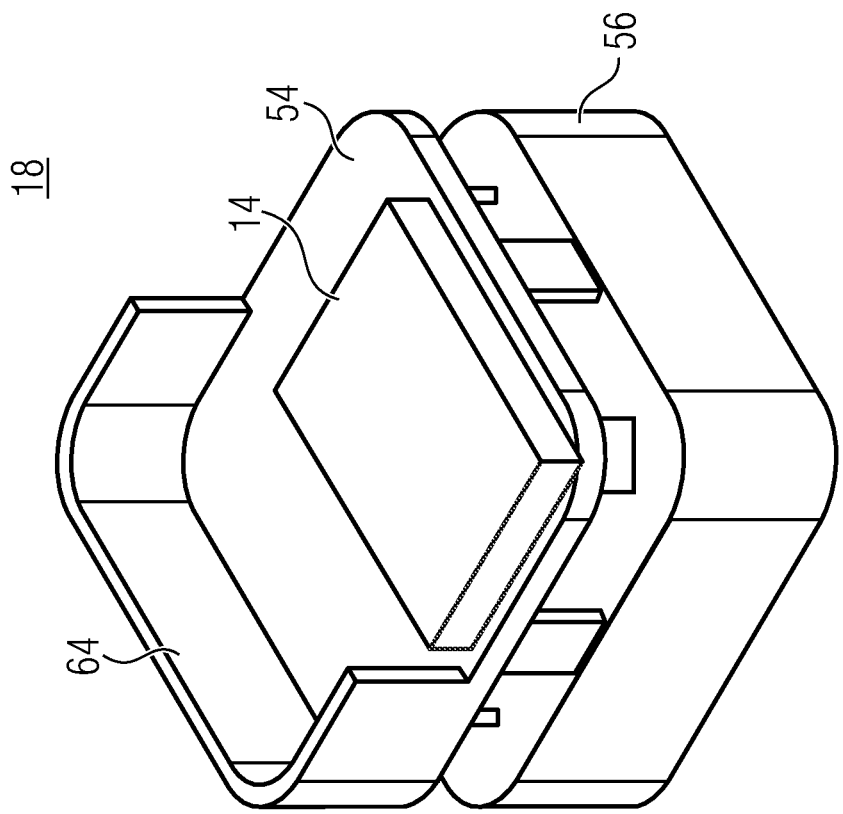
FIG. 9 a-d are schematic illustrations for additional explanation for exploiting mass inertia of the sorting good according to embodiments.
Figure 9A:
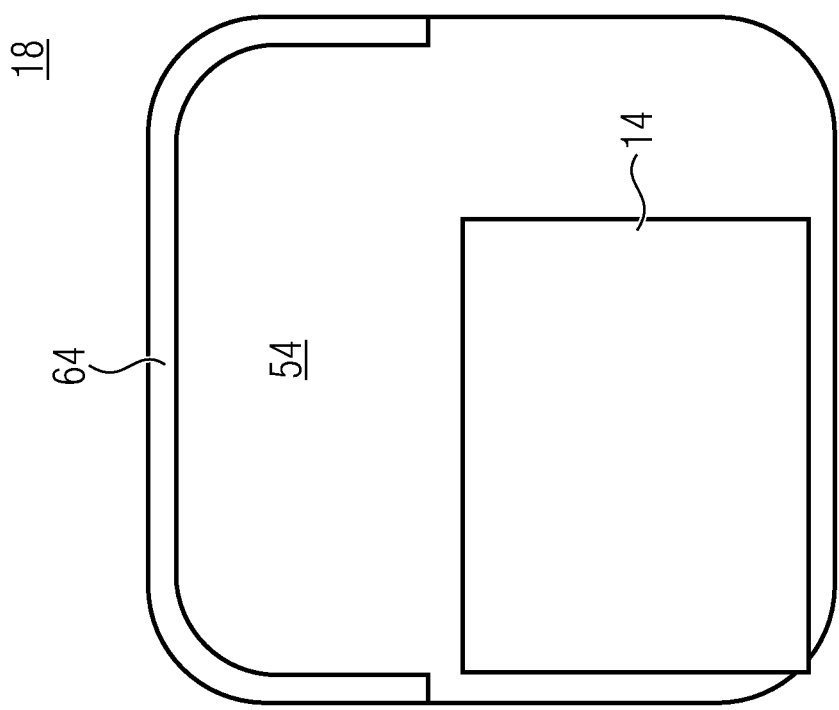
Figure 9D:
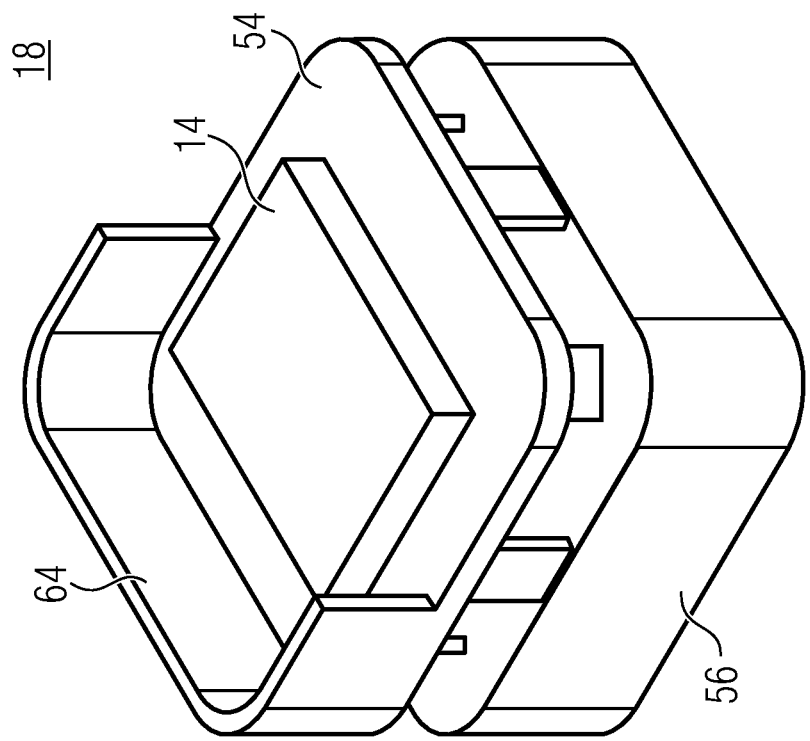

The previous explanations of taking advantage of an inertia of the sorting good 14 are expanded by the explanations of FIGS. 9a to 9d. It is possible that, due to misplacement or other events, an undesirable placement of the sorting good 14 on the sorting vehicle 18 may occur. Embodiments provide for the sorting vehicle 18 to be arranged to correct such misplacement or, more generally, to change a placement of the sorting good 14 in the sorting good receiving area 54. For this purpose, FIGS. 9a and 9c each show a schematic top view, and FIGS. 9b and 9d show perspective views corresponding to FIGS. 9a and 9c. According to FIG. 9a, a first position of the sorting good 14 in the sorting good receiving area 54 is given. In the example described, it is now desired to correct the position of the sorting good 14 from the position shown in FIG. 9a to the position shown in dashed lines in FIG. 9c in order to obtain the state according to FIG. 9d. For this purpose, a displacement vector v can be determined, for example by means of the control device 24 or the vehicle control unit, and the vehicle control unit can be caused to accelerate the vehicle in the opposite direction to the displacement vector v, wherein the omnidirectional drive unit can be advantageously utilized for this purpose. It is possible, but not necessary, to deviate from the previous trajectory. For example, a rotation of the sorting vehicle 14 can also precede in order to align the displacement vector v parallel to the trajectory path, in order to effect the displacement of the sorting good 14 on or in the sorting good receiving area 54 by means of simple acceleration or delay along the trajectory path.

In a complementary approach, a displacement from the position shown in FIG. 9d to the position shown in FIG. 9b can also be performed. Position detection can be performed, for example, by means of optics and/or weight sensors or the like. Furthermore, with knowledge of the sorting good properties, such as a mass, size, surface condition of the sorting good and/or the sorting good receiving area, unintentional slippage can also be avoided. Knowing these characteristics, a trajectory of the sorting vehicle 18 in the sorting system 100 can be controlled accordingly.

This means that according to an embodiment, a sorting vehicle or the control device 86 of the sorting vehicle or the control device 24 of the sorting system is configured to adjust control of the sorting vehicle, taking into account a sorting good property such as a size, mass, surface quality or the like, in such a way that the sorting vehicle travel is adapted to the sorting good property.

The control device 24 of the sorting system 100 and/or the control device 86 of the sorting vehicle 18 may be arranged to position a mechanical boundary, such as the retaining area 64 during travel, such that a change in the travel or speed vector of the sorting vehicle prevents the sorting good 14 from sliding down during a resulting relative movement of the sorting good 14 with respect to the sorting vehicle 18. For example, during travel of the sorting vehicle 18, the retaining area may be directed forward to prevent it from falling down, for example, during abrupt braking, for example, during an emergency stop. Also, during a turn, the retaining area 64 may be positioned, for example by the control device 24 or control device 86, to prevent falling, for example by rotating the sorting vehicle 18. Before or during an arrival of the sorting vehicle 18 at a terminal point or a transfer station, the retaining area 64 may be moved to a non-interfering position, for example to allow the sorting good to intentionally slide down due to braking or an impact.

According to an embodiment, the control device 24 of the system 100 and/or the control device 86 of the sorting vehicle 18 is aware of at least one parameter of the load items (such as weight, dimensions, surface (coefficient of friction), position of center of gravity, . . . ) (e.g. by the shipping information) or is identified by suitable sensors. Such a sensor system can be arranged internally or externally of the sorting vehicle and can be linked to shipment information, for example. An arrangement external to the vehicle within the system can be arranged, for example, on the transfer station or in the more or less direct feed thereto, which can be combined with an arrangement on the vehicle or substituted therefrom. It is possible different parameters to be detected by different sensor systems at different locations.

Based on these parameters, the trajectory can be adjusted. For example, the trajectory of the vehicle 18, which has at least the path, acceleration and speed values, can be adjusted to enable the vehicle to follow this trajectory. For example, if the weight of the loaded goods is very high, the acceleration of the vehicle may be reduced, as the required forces could otherwise not be reliably generated by the drive. Furthermore, for example, an adaptation of the load discharge trajectory depending on the friction value of the loaded goods is provided in order to enable the most precise and reliable discharge possible. With a high friction value, a higher negative acceleration and possibly even a combined impact is used to overcome the static friction between the loaded goods and the load receiver and to move the loaded goods to the terminal point. With a low coefficient of friction, weaker braking may be sufficient, resulting in less wear, e.g. on the vehicle, and higher throughput of the sorting system can be achieved due to less loss of speed.

According to an embodiment, a control and/or rotation of the vehicle during a turn may be controlled to counteract falling of the sorting good from the sorting vehicle. For example, the inertia of the sorting good 14 can be pre-calculated and/or estimated based on the trajectory. On the basis of this information, the vehicle turns, for example in a cornering maneuver or during acceleration or deceleration, such that the load safeguard, for example the retaining area 64 of the load receiving means, is aligned in such a way as to prevent the loaded goods from falling down, as described for adapting the movement to the sorting good property. For this purpose, the loaded goods receiver has a wall on at least one side for securing the load.

One or more of the maneuvers described can be performed by utilizing a rotation of the vehicle. For this purpose, it can be advantageous for the sorting vehicle to have a drive device configured to rotate the sorting vehicle with respect to a sorting vehicle center point and thereby cause rotation of the sorting vehicle, for example in the X/Y plane.

Figure 9C:
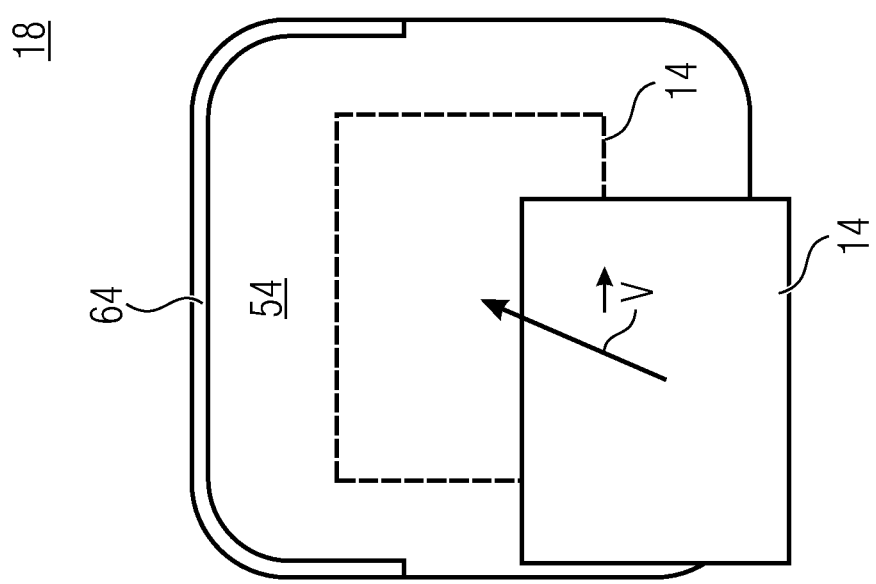

In an embodiment, a sorting system comprises a sensor device configured to detect a relative actual positioning of a sorting good on a sorting vehicle, wherein the control device 24 is configured to compare the actual positioning with a desired positioning, compare the dashed positioning of FIG. 9c, and to determine a deviation from the desired positioning. The control device 24 is configured to change the actual positioning in order to at least reduce the deviation, wherein a corresponding acceleration and/or delay of the vehicle can be used for this purpose. According to an embodiment, the control device 24 is configured to control the vehicle to change the actual positioning under the action of an inertia of the sorting good; and/or to control a tool to change the actual positioning. That is, some type of gripper and/or passive device may also be used to displace the sorting good on the sorting vehicle.

Figure 10A:
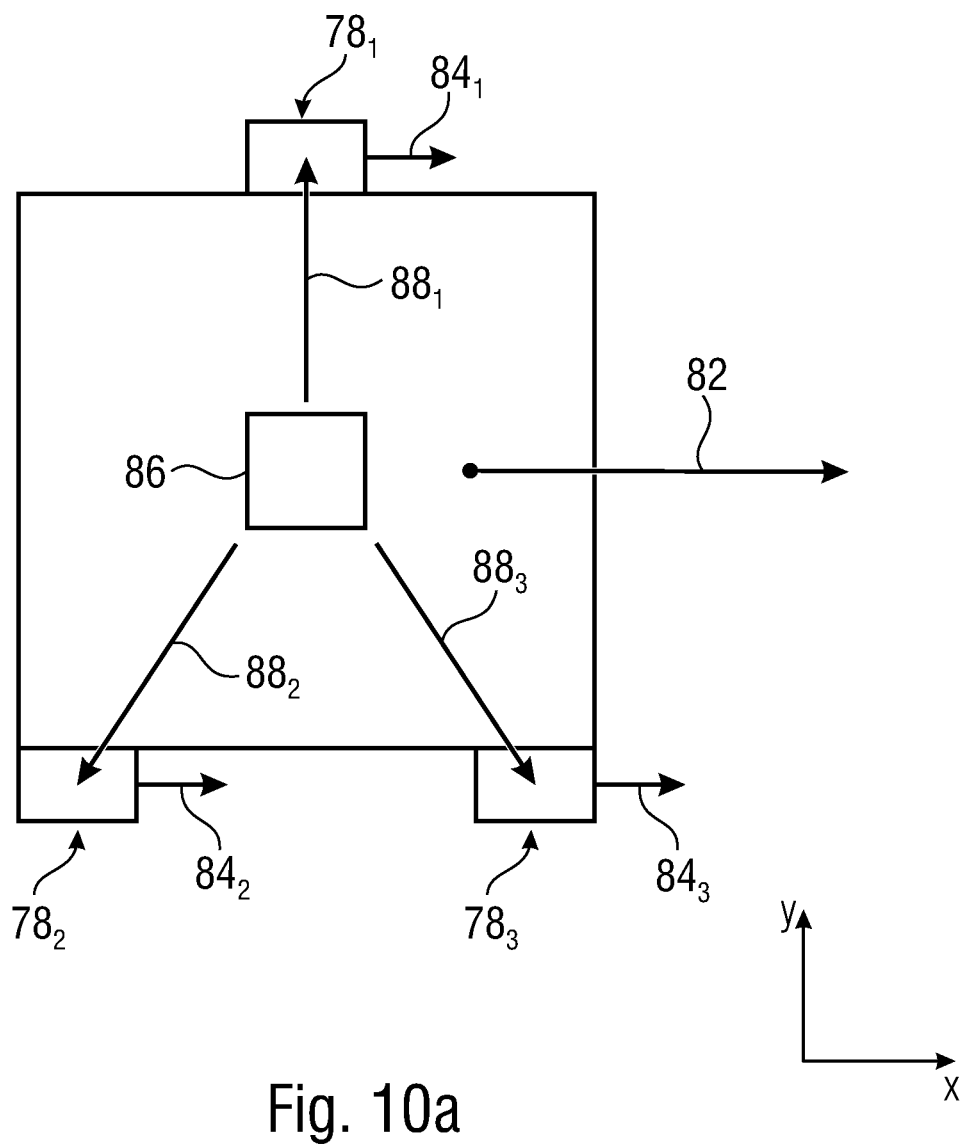
FIG. 10a is a schematic block diagram of a sorting vehicle according to an embodiment comprising an omnidirectional drive system configured to provide movement of the vehicle.

FIG. 10a shows a schematic block diagram of a vehicle 18 according to an embodiment. The vehicle 18 includes an omnidirectional drive system configured to provide movement of the vehicle. In terms of an omnidirectional drive system, it is in accordance with the definition of a holonomic vehicle to be able to describe any trajectory, at least while respecting physical boundary conditions, such as accelerations or the like. Here, the omnidirectional drive system has a plurality of omnidirectional drive devices $78_1$, $78_2$, and $78_3$. The omnidirectional drive system comprises at least three, but possibly also 4, 5 or a higher number of drive devices 78, which may be arranged on the sorting vehicle 18 to be symmetrically or asymmetrically distributed. Each of the drive devices $78_1$ to $78_3$ is configured, for example, to apply a force to a traveled surface to provide a force component and/or a motion component for a movement 82 of the vehicle 18. Movement contributions $84_1$, $84_2$ and $84_3$, respectively, provided by the drive devices $78_1$ to $78_3$ can be rectified for this purpose, i.e. be rectified at least in their direction, but advantageously also in their amount, for example in order to execute a movement along a straight line. However, the motion contributions $84_1$, $84_2$ and $84_3$ can also be arranged along different x/y directions, for example in order to provide in combination the movement 82 along a straight line or to enable rotation of the vehicle 18.

The vehicle 18 includes a control device 86 for providing a control command to the omnidirectional drive system which includes an instruction to execute the movement 82. In this regard, each of the drive devices $78_1$, $78_2$, and $78_3$ may receive a respective control command $88_1$, $88_2$, and $88_3$, respectively. The control commands $88_1$, $88_2$ and $88_3$ may be different from one another, but are advantageously formed to match or be identical, such that for a matching time interval each of the plurality of omnidirectional drive devices may receive the same control command. To this end, multiple signals of the same content may be sent to different drive devices $78_1$, $78_2$ and $78_3$ and/or one signal may be sent to multiple drive devices.

The motion contributions $84_1$ to $84_3$ can be extracted directly from the control commands or derived from them. For example, the respective control command $88_1$ to $88_3$ can contain a specific instruction for the respective decentralized drive. However, it is of advantage for the decentralized drive device, knowing the geometry of the vehicle, such as the relative positioning of the decentralized drive devices, to create an applicable control for the respective actuator from a desired direction of travel, travel vector or trajectory specified in the control commands $88_1$ to $88_3$, so that, for example, each of the decentralized drive devices can obtain a matching control, but based on the different positioning of the respective decentralized drive device 82 implements it differently, i.e. creates different desired contributions which the respective drive device is to drive.

At this point it becomes clear that the movement of the vehicle is directly linked to the control of the individual drive devices, i.e. their desired contributions, so that when knowing the vehicle geometry given in embodiments, a mutual transfer between individual desired contribution and vehicle movement or between actual movement contribution and actual vehicle movement and/or the effect that a deviation between the setpoint movement contribution and the actual movement contribution has on the travel of the vehicle, can be determined without any problems by the decentralized drive devices, and explanations on one of the respective pairs of terms relate directly to the other term.

Figure 10B:
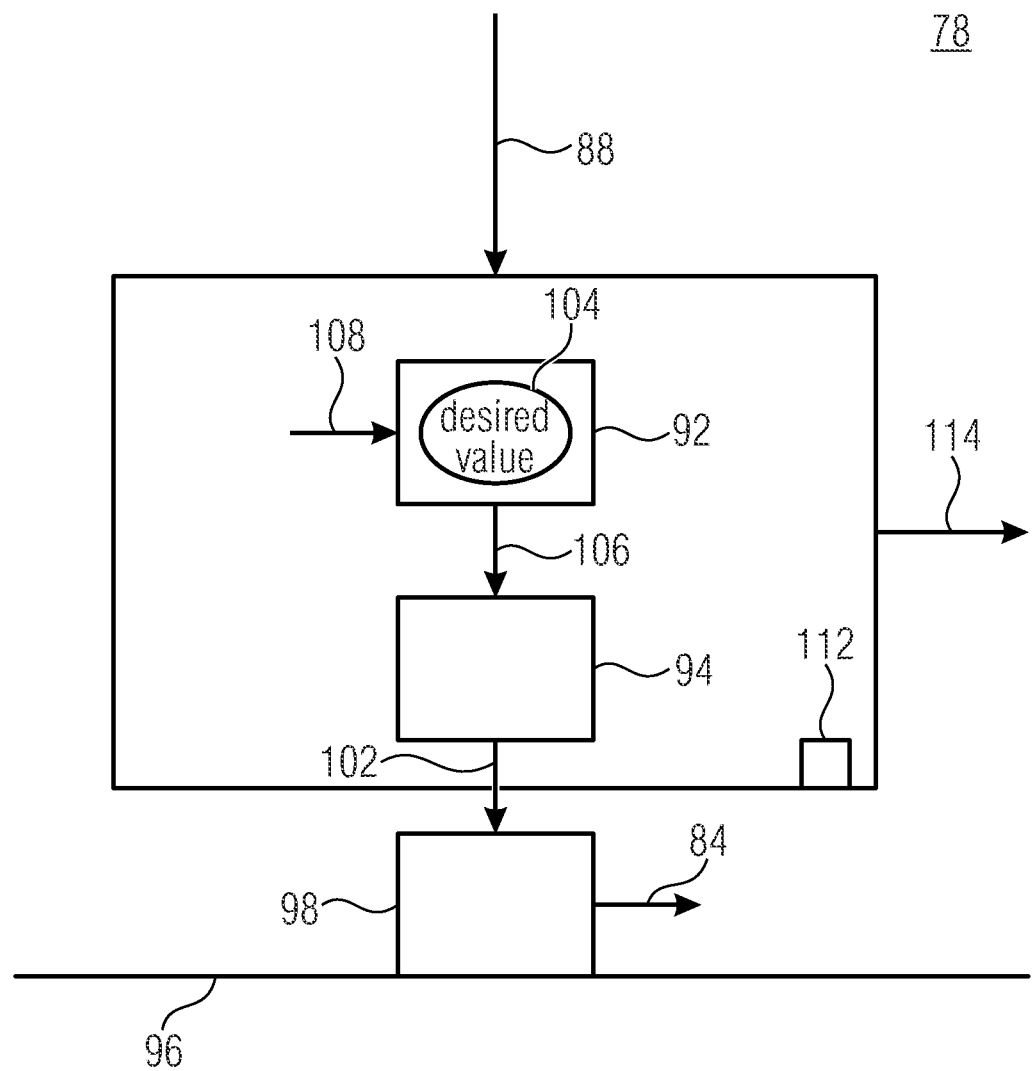
FIG. 10b is a schematic block diagram of an omnidirectional drive device of the sorting vehicle, with a decentralized computing device according to an embodiment.

FIG. 10b shows a schematic block diagram of an omnidirectional drive device 78 of the vehicle 18, for example the drive device $78_1$. The omnidirectional drive device comprises a decentralized computation device 92 and an actuator 94 associated with the decentralized computation device and configured to provide the desired motion contribution 84. Here, it is possible for the actuator 94 to be in direct contact with a motion surface 96, for example a ground, a floor or the like, to directly generate the motion contribution 84. Alternatively, a transmission member 98 is provided, receiving a force 102 from the actuator 94 and converting it into the motion contribution 84. For example, the transmission member 98 may comprise a wheel, particularly an omniwheel or a mecanum wheel. However, for most of the embodiments described herein, it is irrelevant whether the actuator 94 and the transmission member 98 are collectively understood as an actuator or as separate components. That is, even though some of the embodiments explained herein refer to the actuator 94, this does not exclude joint consideration with the transmission member 98. In other words, the drive device 78 may include a wheel, a motor/actuator, and a controller, such as the computation device 92. In particular, the computation device 92 may comprise a processor or CPU, a microcontroller, or other programmable control device, such as a field programmable gate array (FPGA) or the like.

The decentralized computation device 92 is configured to determine a desired motion contribution 84 for the vehicle from the control command 88, which may indicate a desired movement of the vehicle 104, and to determine control 106 of the associated actuator from the desired motion contribution 84. While the control command 88 may be identical for all drive devices $78_1$ to $78_3$ of the vehicle 18, for example, the determined desired movement 104 may also be identical in all decentralized drive devices or decentralized computation devices 92. However, the control 106 derived therefrom may be different from one another in the different drive devices $78_1$ to $78_3$, for example based on knowledge of or consideration of the location of the decentralized drive device or actuator on the vehicle.

The decentralized computation device 78 is further configured to determine a deviation from the travel vector, for example, by providing the decentralized computation device 92 with information on an actual movement 108 of the vehicle, which may be obtained, for example, by determining the actual movement contribution. The decentralized computation device 92 is further configured to initiate measures to correct the deviation from the travel vector in the case of a deviation between the desired movement contribution 84 and the actual movement 108 or the actual movement contribution. To this end, such action may include an instruction to itself, such as an adjustment of the control 106 to change a speed and/or a direction of its own motion contribution. Alternatively or additionally, the drive device 78 may send, for example through the decentralized computation device 92, an instruction 114 to one or more other drive devices, including an instruction to adjust their control. This may be an explicit instruction, but may also be information that allows inferring as to the corrective action to be taken there to be made at the other drive device. For example, the instruction 114 may contain information on a correction vector containing a deviation between the desired movement 104, for example considered as a vector, and the actual movement 108, which is synonymous with the actual motion contribution above, for example considered as a vector.

Here, the deviation can be reduced or compensated to a large extent, or at least partially reduced, which is already an improvement. The decentralized computation device can be designed to obtain from this information a correction vector for a travel vector representing the desired movement, and to execute the actuation based on a combination of the travel vector with the correction vector in order to adapt the actuation. That is, such an adjusted actuation may already be corrected to compensate for the error, at least in part. This can be done without restrictions based on the local motion vector as well as on the global motion vector, which can describe the motion vector of the vehicle differently than the local motion vector describing the movement of the decentralized drive unit.

According to embodiments, the decentralized drive device 78 may comprise a sensor device 112 associated with the drive device 78, which makes it possible in the vehicle 18 to in a decentralized manner detect the movement of the mobile device in the drive devices $78_1$ to $78_3$ in a decentralized manner, and to determine the deviation of the actual movement contribution from the desired movement contribution based on the decentrally determined movement. For example, the sensor device may comprise optical sensors, in particular an optical flow sensor or a sensor for detecting an optical flow, such as an image sequence. The optical flow can be understood as a vector field of the speed, projected in an image plane, of visible points of the object space in the reference frame of the imaging optics, which means that a displacement of points in sequentially captured images can allow conclusions as to the speed. It should be noted here that the results of the sensor device 112 may provide results valid for the location of the sensor device 112 and consequently the drive device, but may, for example, deviate from an overall motion vector of the movement 14 based on a deviation from a geometric center of the vehicle 18. Regardless, the drive device may be configured to determine the movement using the sensor device 112 and, in particular, the optical flow sensor. In fact, deviating or influencing the sensor signal based on the local position may be desirable in that it may provide precise information on how to adjust the control locally, within the drive device 78.

Some of the sensors used may be a shared resource, i.e., a shared sensor for multiple sensor devices 112. For example, the optical flow may provide information for multiple decentralized drive devices, while monitoring the number of revolutions is decentralized because the information are decentralized.

For example, the decentralized computation device can detect that the number of revolutions of a wheel deviates from a value as aimed for in the desired motion contribution and/or expected by means of the supplied energy, such as electric current, which can be an indication of slippage or other effects of the wheel. Alternatively or additionally, an optical sensor may indicate that the actually achieved local speed deviates in amount and/or direction from the desired motion contribution.

The drive device 78 may be configured to determine the deviation based on a number of revolutions of the decentralized actuator 94, a power consumption of the decentralized actuator 94, which may be measured directly as a current or indirectly, for example via an electrical voltage or the like, and/or the movement, such as sensed via the sensor device 112. Thus, the number of revolutions of the decentralized actuator in combination with the power consumption or current consumption of the decentralized actuator can already provide an indication as to whether the provided power is converted into a number of revolutions to the desired extent and/or whether the obtained number of revolutions results in the desired movement of the vehicle. Several causes of error can thus be monitored simultaneously.

In summary, each of the decentralized computation devices may be configured to determine a deviation of the motion contribution provided by the associated actuator from the desired movement overall and/or with respect to the desired motion contribution, and to transmit the deviation to other drive devices of the plurality of omnidirectional drive devices. In the slip example explained above, this may include, for example, an instruction to reduce drive power to reduce or avoid a change in the actual trajectory relative to the desired movement. Such an instruction can, for example, be formulated in such a way that information, such as a correction vector, can contain information to the other drive devices, which is designed in such a way that the contribution derived from it for the creating decentralized drive device is within the limits the decentralized drive device is currently capable of providing. This allows an adequate response to this deviation there. Alternatively or additionally, it is made possible that the remaining drive devices are informed about their own deviation and can already react to this case at an early stage, for example by the decentralized computation device determining that the provided drive power or electric current does not lead to a desired number of revolutions and/or speed. In particular, the knowledge about the own control is available locally and can already be evaluated there for deviations.

Accordingly, drive devices are configured to receive corresponding information indicating a deviation between a desired movement and a motion contribution generated by another drive device. The decentralized computation device there can be configured to adjust the control of the associated actuator based on the deviation of the other drive device.

Figure 11A:
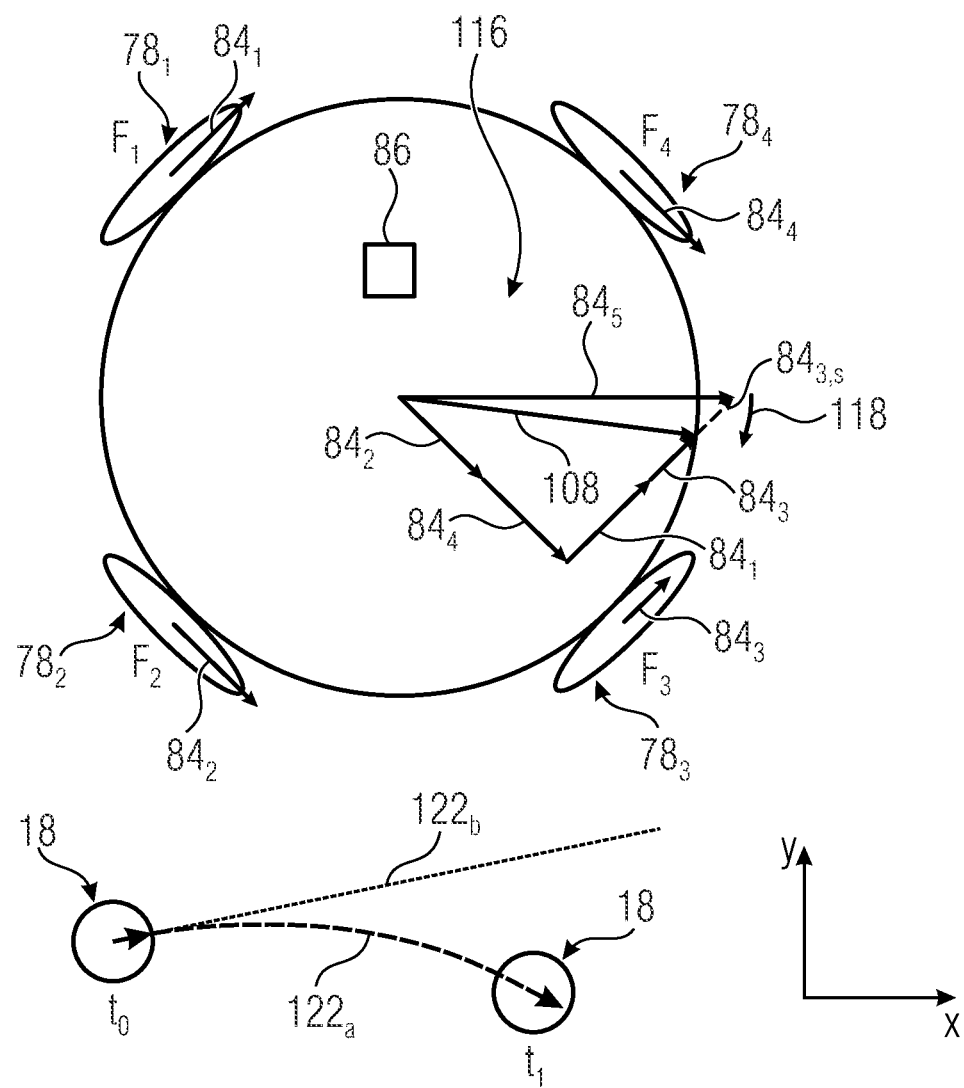
FIG. 11a is a schematic top view of a sorting vehicle according to an embodiment in connection with the individual control of different drive devices according to an embodiment.

FIG. 11a shows a schematic top view of a sorting vehicle 18 according to an embodiment in connection with the individual control of the drive devices 78. The vehicle 18 comprises exemplarily four symmetrically arranged drive devices $78_1$ to $78_4$, in order to enable an omnidirectional movement of the vehicle 18. To achieve a desired movement $82_5$ by means of transmission of suitable control commands by the control device 86, the drive devices $78_1$ to $78_4$ are controlled. The movement contributions $84_1$ to $84_4$ are exemplarily shown as force vectors $F_1$, $F_2$, $F_3$ or $F_4$. FIG. 11a shows an error case in which, for example, the drive device $78_3$ provides an erroneous motion contribution $84_3$, which in the depicted force diagram 116 leads to the actual movement 108 deviating from the desired movement $82_s$, by way of example, by the deviation between the desired motion contribution $84_{3,s}$, the desired quantity and the actual motion contribution $84_3$. This results in a deviation 118 which changes the actual direction and speed of the vehicle 18, which without correction intervention would result in a deviating trajectory $122_a$ of the vehicle 18 from the depicted time $T_0$ to the next time $T_1$, such as the next control interval, and compared to a desired trajectory 122S.

Figure 11B:
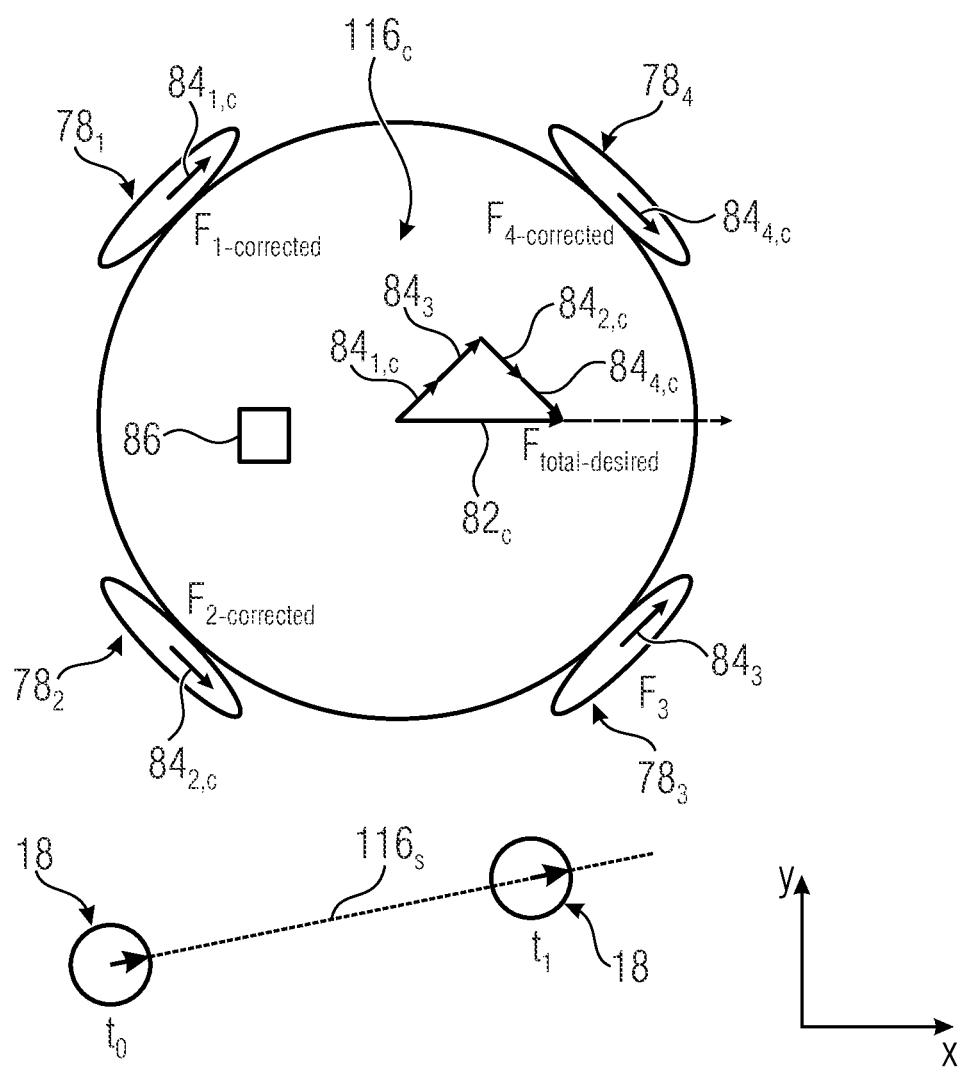
FIG. 11b shows a possible effect of the embodiments of FIG. 11a described herein for correcting a deviation occurring according to an embodiment.

FIG. 11b shows a possible effect of the embodiments described herein. For example, the other drive devices $78_1$, $78_2$ and $78_4$ become aware of the deviation of the drive device $78_3$ and can adjust their own control based on this, which can result in corrected controls and thus corrected motion contributions $84_{1,c}$, $84_{2,c}$ and $84_{4,c}$ which are adapted to the erroneous motion contribution $84_3$.

For example, the corresponding force vectors can be reduced in magnitude to arrive at a force vector $F_1$-corrected, $F_2$-corrected, and $F_4$-corrected, so that the corrected force diagram $116_c$ can still maintain the desired direction in the obtained movement $82_c$, although possibly at a slower speed. This allows the vehicle 18 to remain on the desired trajectory $122_s$, even though a speed may be reduced. Since the correction can be made locally, a possibly reduced deviation from the desired trajectory occurs, at least compared to centralized control.

It can be seen that the plurality of omnidirectional drive devices can provide decentralized anti-slip control for the drive system. Although in the illustration of FIG. 11b, a reduction in force occurs in the other drive devices $78_1$, $78_2$ and $78_4$, according to other embodiments, a change in direction can also occur, for example if this is used for a rotation to be performed or the like.

According to embodiments, each of the decentralized computation devices of the drive device is configured to detect a deviation of the motion contribution provided by the associated actuator from the desired movement, and to change the control of the associated actuator for a subsequent time interval based on the deviation in order to reduce the deviation. The subsequent time interval may be relatively short based on the control cycles in the decentralized drive devices, and in particular may be shorter than the control cycles of the control devices 86, for which time periods of, for example, 20 milliseconds may elapse between the times $T_0$ and $T_1$. In contrast, the decentralized drive devices can be operated at time intervals which are, for example, shorter than the control cycle of the central control device 86, such as at most 10 ms, at most 5 ms or at most 1 ms or less. This means that the decentralized control can be faster than the central control by a factor of at least 2, at least 4 or at least 20, which can also apply if the central control is operated with a different interval.

The decentralized computing devices may be configured to determine a correction vector for a travel vector representing the desired movement, and to execute the control based on a combination of the travel vector with the correction vector to reduce the deviation, as illustrated, for example, by force diagrams 116 and $116_c$.

In other words, one aspect of embodiments described herein is based on the fact that in highly automated vehicles today, many subsystems constitute or are implemented as their own computer. In development, it is often easier, and is therefore done, to use a programmable microcontroller or the like than to develop analog/digital circuitry only for a particular purpose. This may result in unused resources, as microcontrollers are usually oversized. These unused resources may be used to implement embodiments described herein. For example, a corresponding method of operating a vehicle having an omnidirectional drive system configured to provide movement of the vehicle, wherein the omnidirectional drive system includes a plurality of omnidirectional drive devices, and each of the plurality of omnidirectional drive devices includes a distributed motion device and an associated actuator configured to provide a motion contribution for the movement, comprises the steps of providing a control command to the omnidirectional drive system including an instruction to execute the movement, determining a desired movement for the vehicle with each of the decentralized computing devices, determining control of the associated actuator from the desired movement with each of the decentralized computing device, and determining and correcting a deviation from the travel vector with each of the decentralized computing devices.

In the autonomous vehicles described, such as the vehicle 18 and/or 18, each drive unit is equipped, for example, with a microcontroller, the computation device 92. This can take over the control of the motor/actuator and the measurement of all relevant values of the respective drive. The aim is to track a defined trajectory. Furthermore, the central regulating unit, the control unit 86 and all drive units communicate with one another via a serial bus, such as the bus system.

If a drive is unable to maintain the desired travel vector, in a conventional process, the relevant values and the deviation would only be taken into account in the next regulating cycle. A potential error therefore accumulates until the next regulating cycle.

In vehicles and/or methods according to the invention, a more complex instruction is transmitted to the central control. Instead of the control values being transmitted separately at each drive, the desired travel vector is transmitted simultaneously to all drives with just one packet, for example via broadcast. This already leads to the first latency saving. If it now happens that a drive is unable to maintain the desired travel vector, the affected drive unit immediately sends a correction vector. This is possible in particular because each drive unit has the same sensors and is also a measuring point for all highly dynamic relevant values. A deviation is determined by the number of revolutions curve, current curve and the actual movement over the ground. The movement is measured using an optical flow sensor in the travel plane (X, Y). This allows each drive unit, assuming the travel vector and thus assuming the movement of the other drive units, to additionally determine not only its own deviation, but also to determine a catch-up correction. This information is transmitted immediately or as soon as possible to all other drive units via broadcast. The other drive units then adopt the correction vector and adjust their own control.

Such a correction is a good to best possible measure at a given time. Such a fast reaction results in a smaller deviation compared to the conventional method, as can be seen from the comparison between FIG. 11a and FIG. 11b. As a result, the resulting travel vector has approximately the same orientation or only minor deviations, which means that the trajectory is not substantially left or not left. This can take place until the next regulating cycle takes place, in which, for example, the control device 86 can take a higher-level countermeasure. That is, according to an embodiment, the omnidirectional drive devices are configured to correct the deviation between two regulating steps of the control device 86. Optionally, the control device 86 can then itself make a global correction taking into account the error case occurred.

Embodiments allow a way to be provided to provide effective anti-slip control for vehicles with omniwheels, in particular with the use of optical flow sensors, but in which the heading or direction of the vehicle is maximally maintained. In contrast, if the spinning wheels were braked individually, the travel vector would be distorted or corrupted, ultimately creating a disturbance in the control loop that would have to be compensated for, which would be the responsibility of the control device 86, which, however, has latencies. Furthermore, this method offers control with lower latency, since any disturbances can be processed directly on the processors of the motor control units, the drive devices, especially if the control units of all motors are interconnected via a bus system, such as CAN.

Embodiments can be implemented above all in vehicles with individually driven wheels. Omnidirectional vehicles with omniwheel drive are to be emphasized particularly here, as the wheels are always driven individually. This particularly affects fields of application entailing high vehicle dynamics, such as sorting systems with robots.

That is, in a sorting system, at least one sorting vehicle has an omnidirectional drive system configured to provide movement of the vehicle. The omnidirectional drive system comprises a plurality of omnidirectional drive devices, each of the plurality of omnidirectional drive devices comprising a decentralized computing device and an associated actuator adapted to provide an amount of motion for the movement. Further, a control device 86 is provided in the vehicle for providing a control command to the omnidirectional drive system including an instruction to execute the movement. Each of the decentralized computing devices may be configured to determine a desired movement for the vehicle, and to determine from the desired movement for a desired movement contribution control of the associated actuator, and to determine a deviation between the desired movement contribution and an actual movement contribution, and to execute a correction based on the deviation.

Figure 12:
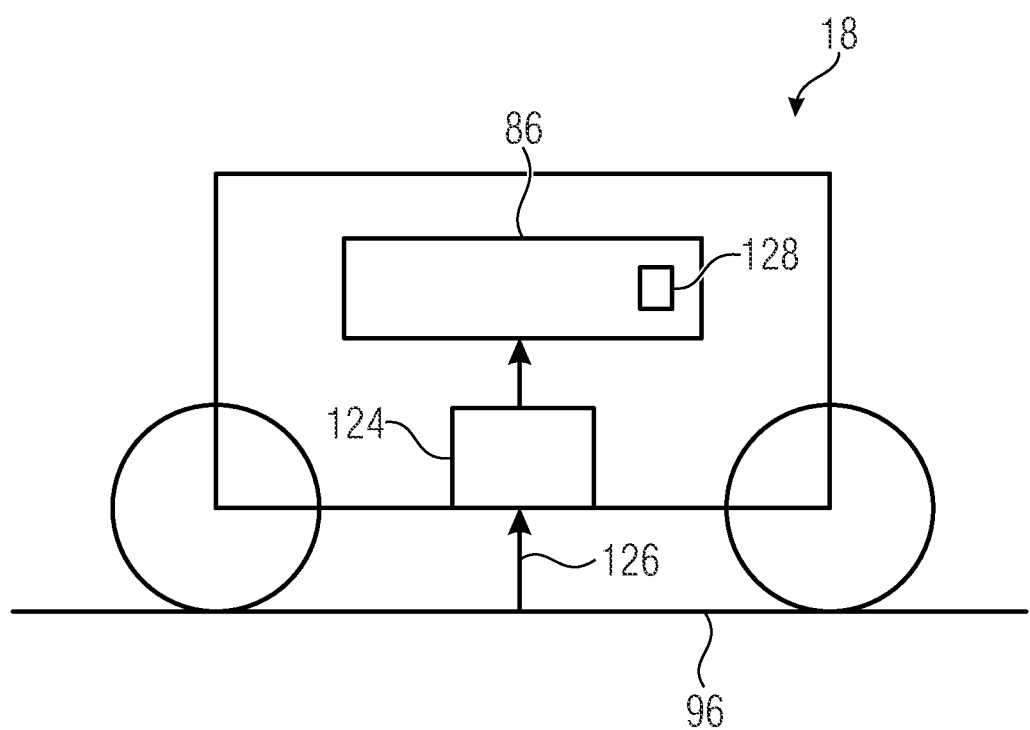
FIG. 12 is a schematic side sectional view of a sorting vehicle according to an embodiment, configured to detect a ground condition of the surface by means of a detection unit in order to perform localization of the vehicle.

Further embodiments relate to the sorting vehicle 18, as described, for example, in connection with FIG. 12, being configured to detect a floor condition of the surface 96 by means of a detection unit 124 of the sorting vehicle 18. For this purpose, for example, a pattern design, color design or surface condition may be used, which in embodiments may be randomly distributed in the surface 96. For example, so-called color sprinklers may be used here, which individually but also in combination with color sprinklers of their neighborhood may provide unique position information for the sorting vehicle 18 with respect to their shape, orientation and/or relative outer direction, at least in partial areas, in order to allow an orientation and/or positioning of the sorting vehicle 18 in the sorting system 100. A detection 126 may be matched by means of suitable matching in a database 128 possibly provided in the sorting vehicle 18 or accessible by means of wireless communication. For this purpose, mapping of the ground 96 has to be carried out before. To increase the reliability of the positioning, it is also possible to base the positioning of the sorting vehicle in the sorting system 100 on taking into account a history of the movement of the vehicle 18. For example, in the case of ambiguity, an exclusion of very unlikely positions may be performed if an unusually large or even impossible distance would have to be traveled from a previous position determination step to a current one, while another potential match in the database is positioned very close. The vehicle controller 86 may be configured to execute the route through the sorting system 18 based on such positioning, which makes it possible to avoid an external device for orientation, such as by means of QR codes or the like or other markings on the ground.

Such a sorting vehicle may comprise a processing unit, such as the control device 86, configured to obtain scanning information provided by the detection unit from a scan of a surface 96, the scanning information comprising information on an inherent feature of the surface. The processing unit may be configured to extract the inherent feature from the scanning information and, based on the extraction information, perform matching with a database, such as database 128, wherein the database stores extraction information for a plurality of inherent features of the surface. Based on the matching, the processing unit can determine the position of the detection unit in the sorting system.

Figure 13:
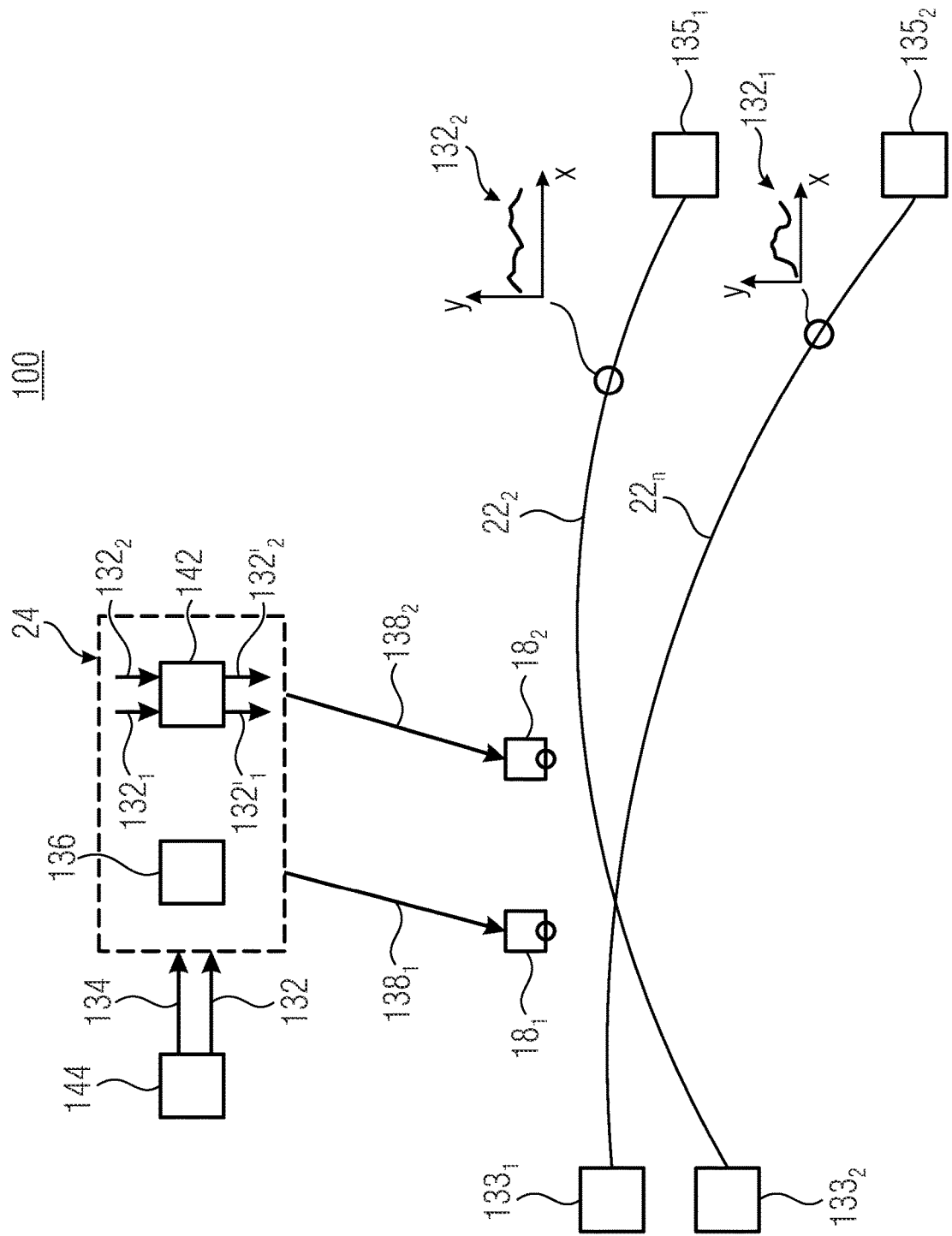
FIG. 13 is a schematic representation of a sorting system according to an embodiment in connection with a selection of trajectories for the sorting vehicles.

In another embodiment, the controller 24 of the sorting system is configured to plan a route such that the vehicles travel through the sorting system as quickly as possible, for which purpose a collision or possible collision with other sorting vehicles is taken into account in advance and a possible maximum speed of a sorting vehicle is reduced at least in places or temporarily, in order to avoid a collision and/or a different trajectory is selected, which can then be traversed at a comparatively high speed, for example to enable a global or at least local maximum of possible speeds or minimum of delivery times. If, for example, FIG. 13 is considered, which shows an exemplary schematic representation of the sorting system 100, then for the selection of the trajectories 22 a function of the control device 24 may also be to provide a speed profile 132 in addition to pure route information 134.

The sorting system 100 may include a coordination device 136 configured to communicate travel orders $138_1$ and $138_2$ to the vehicles $18_1$ and $18_2$. Each of the travel orders $138_1$ and $138_2$ may describe a trip from one of the start points, such as insertion points 133, to one of the terminal points 135 of the trajectory along a trajectory 22. As part of these travel orders, a speed specification may also be transmitted and modified by a collision avoidance device 142 to obtain a modified speed specification $132'_1$ and/or $132'_2$ that allows the vehicles to travel through the sorting system 100 without colliding, even on intersecting routes or trajectories.

The control device 24 can be configured to determine dynamic routes for the travel orders and to assign them to the vehicles 18. Alternatively, a static assignment can also take place, in which case the control device 24 nevertheless assigns the travel orders for the transport of sorting good (transport orders) or of tools or also other travel orders, for example for empty runs by means of the sorting vehicles, to the vehicles.

The control device 24 may be configured to allocate the transport or travel orders by means of negotiation in which the different transports and/or sorting vehicles are in competition or different negotiating positions with respect to each other. For example, the control device 24 can be configured to consider for the negotiation at least one of a time until the sorting goods are picked up by a sorting vehicle, for example influenced by a distance between both elements, possible waiting indications and/or a possible speed, a time until the sorting goods are discharged by a sorting vehicle, a remaining battery power of a sorting vehicle, a time duration until a next battery charge of a sorting vehicle, a transport capacity of a sorting vehicle, and/or a number of trailers that can still be coupled to a sorting vehicle and/or already coupled trailers, for example because additional trailers can lead to increased energy consumption and/or slower travel. In other words, the sorting vehicles or software agents or devices associated with them can negotiate. Criteria or main criteria or arguments may be incurred costs, which in turn may essentially influence the required time arising if a vehicle would drive to the pickup of the assigning transport order or starting point of a travel order, optionally taking into account completions of a still existing order to be done before. Additional criteria can be, for example, a remaining battery capacity until the next charging and/or, in the case of the use of trailers, a number of already coupled trailers, since a higher number of trailers can be interpreted as worse, because a slower speed and/or a larger obstacle is produced, which means that the structure from sorting goods vehicle and trailers becomes bulkier in the sorting system.

At least a subset of sorting vehicles may be configured to move along trajectories in the sorting system. The control device 24 may comprise a computing device configured to compute a number of trajectories between a number of start points and a number of terminal points, each trajectory having associated therewith a speed specification for a sorting vehicle along the trajectory. The control device 24 may include a coordination device configured to communicate travel orders to the plurality of sorting vehicles, each travel order comprising a travel from one of the start points to one of the terminal points along one of the trajectories. The control device 24 may include a collision avoidance device 136 configured to examine a trajectory for possible collisions with another sorting vehicle of the sorting system for a new travel order to obtain collision information indicative of a possible collision. The speed specification 132 associated with the trajectory may be modified based on the collision information to obtain a modified speed specification 132', thereby avoiding the possible collision. The sorting system may be configured to transmit the new travel order comprising an instruction including the trajectory and the modified speed specification to a controller of the sorting vehicle. This also enables existing or executed travel orders to not be modified, possibly including the speed specification. A computing device 144 may be configured to calculate the trajectories 22. At this point, it is pointed out that while a starting point of a trajectory may be an insertion point, a trip between an insertion point and a terminal point may have multiple trajectories and thus multiple starting points and terminal points.

Between a specific start point 133 and a specific terminal point 135, the computing device 144 can calculate one, but also several trajectories. These can be calculated, for example, as so-called splines. Several trajectories can make it possible to process several travel orders in parallel, alternatively or additionally it can be possible to have an alternative route available in the case of having to react to a collision.

According to another advantageous embodiment, the sorting vehicles 18 of the sorting system 100 are configured to communicate with one another and/or to emit at least one signal which can be received by other sorting vehicles, either for information exchange and/or for positioning. For example, a spatial area of the sorting system traversed by the sorting vehicles may be spatially divided. It is possible that a resource of a wireless transmission mechanism, for example Bluetooth, WLAN or the like, is assigned to each of these sub-areas and that a sorting vehicle uses the resource of its own sub-area and/or neighboring sub-areas to communicate that it is in this sub-area or will travel through this sub-area soon. Alternatively or additionally, it is possible to monitor the resource space of its own and/or neighboring subareas in order to possibly detect a possible collision at an early stage, for example if a sorting vehicle has broken down in a neighboring subarea, which sends corresponding information so that the obstacle can be detected at an early stage.

Figure 14:
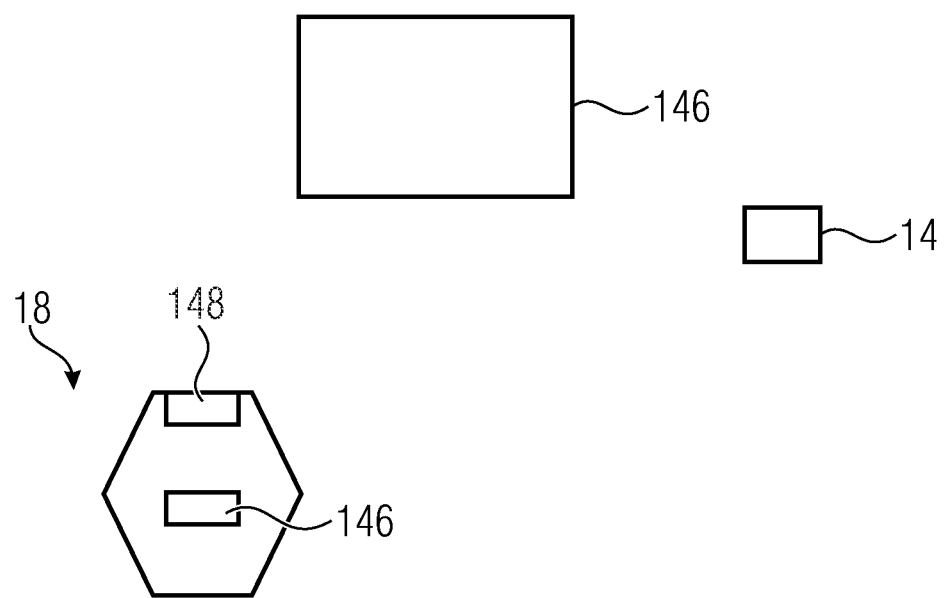
FIG. 14 is a schematic block diagram of a part of a sorting system according to an embodiment, with an optional identification device.

FIG. 14 shows a schematic block diagram of a part of the sorting system 100 with an optional identification device 146 configured to identify at least one feature of the sorting good 14 and to assign it to the sorting good. For this purpose, the identification device 146 may, for example, comprise cameras and/or be configured for wireless or radio-based identification. The identification device 146 may be configured, for example, to scan at least one side of the sorting good at a time for the feature. This can be done, for example, by scanning with a camera which can detect one, two, or three sides at a time when the sorting good is assumed to be a cube. Multiple cameras can be used to scan a greater number of sides. It is possible that the identification device is set up to scan, for example, up to five sides of the sorting good using two cameras, which may include a side of the cube obscured by means of the sorting vehicle. However, it is also possible for the identification device to be at least partially implemented in the sorting vehicle, wherein all sides can also be scanned. A similar effect can be achieved if the sorting vehicle is formed transparently in a certain area, for example, or if other measures are implemented.

According to an embodiment, the control device 24 of the sorting system is configured to control a sorting vehicle into a first relative positioning for a first feature recognition attempt, and to control the sorting vehicle into a second relative positioning for a second feature recognition attempt if the first feature recognition attempt is unsuccessful. According to an embodiment, the control device 24 may be configured to control the sorting vehicle into a vehicle movement, comprising a vehicle rotation, to change from the first positioning to the second positioning. It may also be understood that the sorting good is rotated before the identification device so that a higher number of sides of the sorting good can be scanned.

According to an embodiment, the control device 24 is configured to control the sorting vehicle to move or reposition the sorting good from a first positioning to a changed second positioning using a position changing device, and to re-present the sorting good to the identification device with the second positioning. For example, in case of a failed first or previous identification, the positioning can be changed, for example by means of a tilting device, a gripper or the like, and the attempt can be repeated.

According to an embodiment, the identification device is formed at least partially as part of a sorting vehicle, meaning that the sorting vehicle may include at least one sensor of the identification device 146. It is also possible for the sorting vehicle to comprise the identification device 146 completely.

According to an embodiment, the sorting system is configured to identify the sorting good prior to a transfer to a vehicle and/or in an area of a corresponding insertion point, for example in order to link the sorting good to a transport order (i.e., for example, a travel order for a trip during which a sorting good or another object is transported) and/or in order to select a vehicle to be selected for the transport order, for example, by associating the identifier of the sorting good with a terminal point.

According to an embodiment, the identification device 146, in particular when it is arranged outside of a transport vehicle, is arranged to be transportable in the sorting system 100 and configured to be coupled at least in parts to at least one sorting vehicle, for example at an interface 148 of the sorting vehicle 18. During a coupling between the identification device 146 and the sorting vehicle 18, the identification device is configured to be used in the sorting system for identifying sorting goods 14 and/or to be transported. For example, the one piece of identification information, such as an identification number of the load, which may be represented by a barcode or the like, may be read out by means of the identification device 146. A controller of the sorting system 100 can derive from the identification information the sorting destination for the sorting good as the travel destination for the sorting vehicle. For this purpose, the identification information could in principle also be a postal address, from which the sorting destination is then derived with the aid of a database.

According to an embodiment, at least one of the terminal points 16 in the sorting system is formed comb-like to provide at least one receiving space 152, in which sorting good can be received from at least one sorting vehicle by means of wiping it off at the comb-like terminal point. The comb-like structure may be composed, for example, by a frame and extensions 1541 to 1543 in any number 1 which, taken together, form the comb-like structure at least in part. With reference to the sorting vehicle as described, for example, in FIGS. 9a to 9d, for example, the boundary or retaining region 64 may have recesses corresponding to the extensions 154 so that the extensions 154 can engage in such recesses and passage of the sorting vehicle through the end location 16 can cause the extensions 154 to remove the sorting good from the sorting good receiving region 54, for example by pushing it out. Alternatively or additionally, at least one of the terminal locations of the sorting system may include an actuator for removing a sorting good from a sorting vehicle, such as a gripper or the like.

Figure 15:
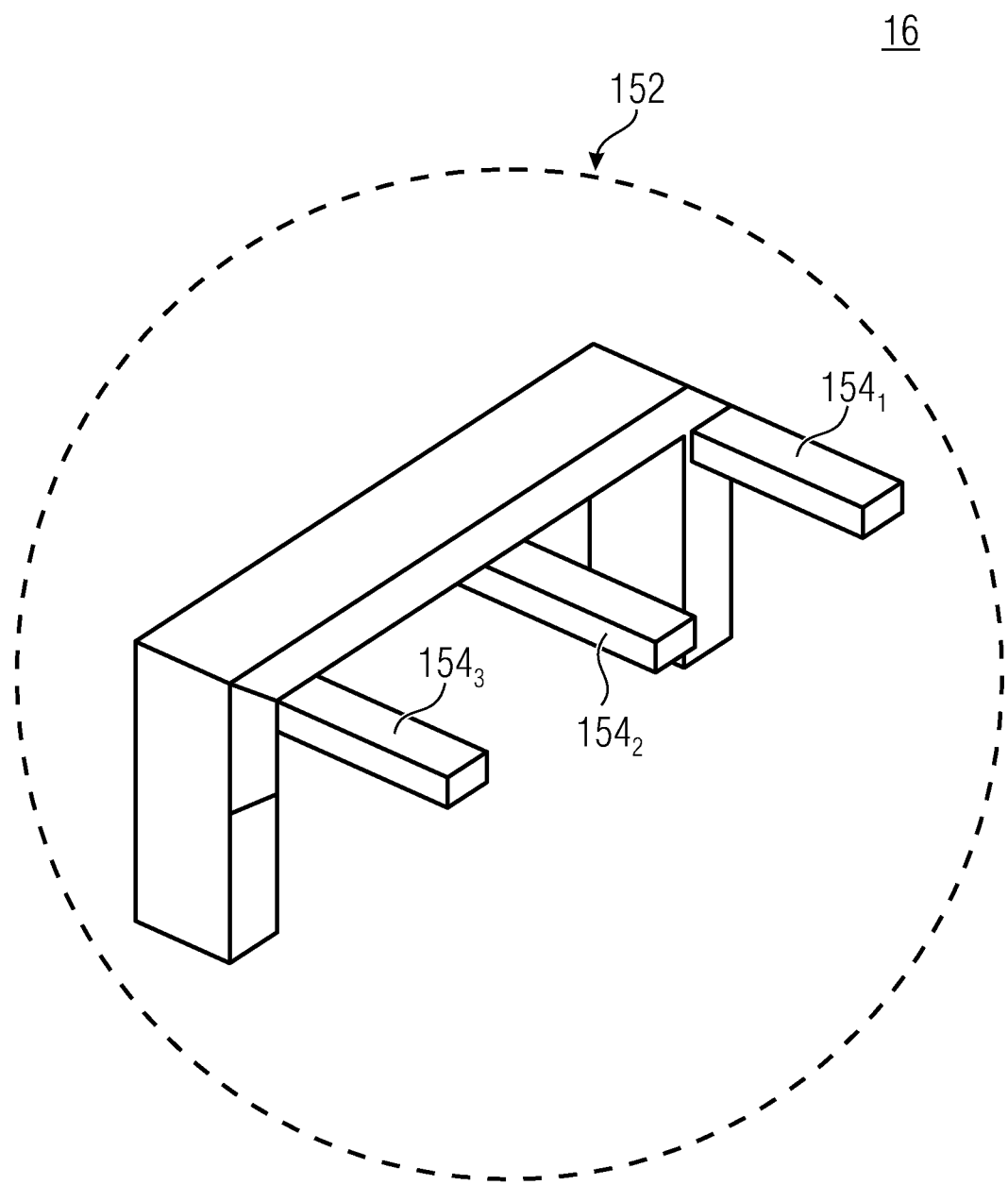
FIG. 15 is a schematic perspective view of a comb-like insertion point according to an embodiment.

Correspondingly, alternatively or additionally, at least one of the insertion points may be formed comb-like, as shown, for example, in the schematic perspective view of FIG. 15, in order to provide at least one deposit space from which sorting good can be picked up by at least one sorting vehicle by means of wiping it from the comb-like insertion point. The area 152 can be arranged in a floor area and/or on a plateau so that the comb-like structure can also be used, for example, for loading the sorting good onto the sorting vehicle, for example, to achieve a comparable result compared to the functions of FIGS. 4a and 4b. For example, a deposit surface may be provided elevated from a floor surface so that a sorting vehicle movable on the floor surface passes under the deposit surface and, in the process, a sorting good is wiped from a loading surface, such as on an upper side of the vehicle, using the comb-like structure, and is thus positioned on the deposit surface. For this purpose, it can be assumed, for example, that a retaining area 64 of the sorting vehicle has corresponding recesses for engagement of the extensions 154 and the retaining area is oriented, for example ahead, in the direction of travel, so that the sorting good 14 can be wiped off over the edge 62a. Another or the same vehicle can, for example, pass the same route under the transfer station by utilizing a relative position rotated by 180°, i.e., in the example, the retaining area 64 is oriented rearward in the direction of travel, wherein the retaining area 64 again wipes off or entrains the sorting good 14 from the deposit surface.

From a combination of the explanations of FIG. 15 regarding an insertion point and a terminal point, it also follows that both an insertion point and a terminal point can be set up as a transfer station and can be configured to receive a sorting good from a vehicle, with the sorting good being picked up by another sorting vehicle. The structure according to FIG. 15 can, as an alternative to using an actuator, be implemented passively.

However, if movement of an element is implemented at the insertion point, the terminal point, and/or the transfer station, it may be advantageous to control transfer of a sorting good to a sorting vehicle at an insertion point by the control device 24 of the sorting system so that movement of the sorting good in a region of the insertion point is synchronized with movement of the sorting vehicle so that the sorting vehicle picks up the sorting good while maintaining a residual speed. This can prevent the sorting vehicle from coming to a standstill, which can allow an overall increase in efficiency or throughput of the sorting system.

Figure 16:
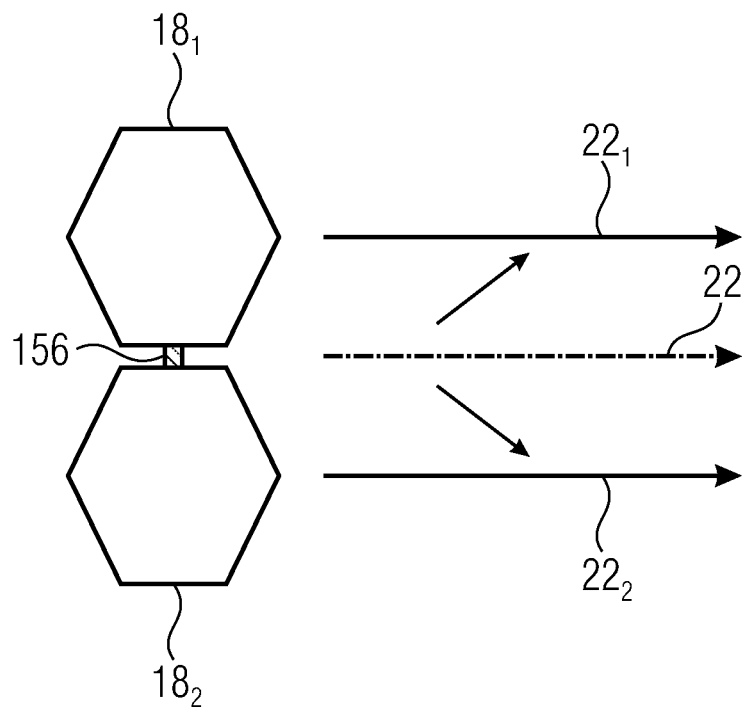
FIG. 16 is a schematic top view of two coupled sorting vehicles according to an embodiment.

The previous embodiments refer to a transport of a sorting good by a sorting vehicle. According to an embodiment, however, it is also intended to transport so-called bulky goods, i.e. oversized sorting goods and/or particularly heavy sorting goods. For this purpose, according to an embodiment, it is provided for a first sorting vehicle and a second sorting vehicle in the sorting system to be configured for mutual coupling to form a common vehicle. This common vehicle may perform a common transport of a sorting good based on a trajectory influenced by the coupling. Such a scenario is illustrated in FIG. 16 and is readily implementable in a sorting system described herein. For example, the sorting vehicles $18_1$ and $18_2$ are coupled to each other using a coupling 156. The coupling may include, for example, mechanical coupling and/or magnetic coupling as described in connection with tools to be coupled. For this purpose, trajectories $22_1$ and $22_2$ for the sorting vehicles $18_1$ and $18_2$ may result from a trajectory 22 possibly determined for a small sorting good, which trajectories run parallel to each other, for example, with a distance also being variable, for example when the combinatorial vehicle from the sorting vehicles $18_1$ and $18_2$ performs a combinatorial rotation.

According to an embodiment, the control device 24 determines, for example, a master and a slave of two vehicles, for example, a higher number of slaves in the case of a higher number of vehicles to be coupled, which makes it possible for one vehicle, the master, to take control of the other vehicle or vehicles, for example in order to coordinate control commands generated locally at the vehicle or vehicles. The vehicles may be able to identify themselves, such as by patterns arranged on side surfaces of the vehicles, although centralized control may also perform this function or make it obsolete. Alternatively or additionally, the sorting vehicles can determine their position, for example using a ground camera and/or external localization, and can exchange it with one another.

Figure 17:
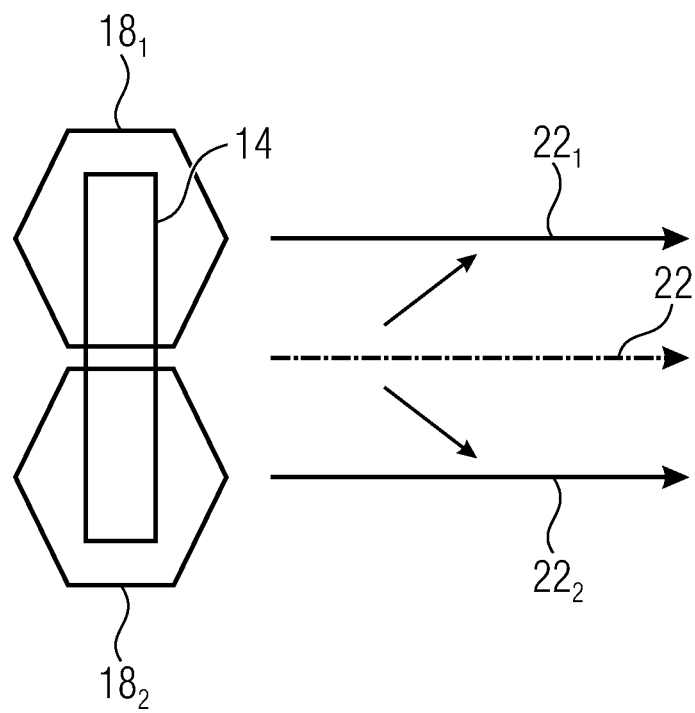
FIG. 17 is a schematic top view of two sorting vehicles not coupled to each other for common transport of sorting goods according to an embodiment.

According to an embodiment described in connection with FIG. 17, it is also possible for at least a first sorting vehicle and a second sorting vehicle to be directly uncoupled to each other but controlled on mutually dependent trajectories $22_1$ and $22_2$ to enable a common transport of the sorting good 14. In other words, based on control by the sorting system 100 or based on vehicle control, the sorting vehicles $18_1$ and $18_2$ may behave as if they were coupled by means of the coupling 156, even though a corresponding mechanical or magnetic coupling is not provided here. Regardless, the sorting good 14 may result in a mechanical connection between the two sorting vehicles $18_1$ and $18_2$, but this is not to be understood to be a mechanical coupling in the sense of the coupling 156 of FIG. 16.

Depending on a (theoretical) trajectory related to the sorting good, it is possible to mathematically calculate for each vehicle involved, depending on its initial offset from this theoretical trajectory when picking up the load, which speed vector the sorting vehicle is to maintain at each point in time during the transport of the sorting good. If the sorting vehicle has, for example, an omnidirectional drive device, this can also include determining which orientation about the vertical axis the vehicle is to have at each of the points in time. Thus, the trajectory of the sorting good can be determined by the control device 24 and the trajectories of the vehicles can be derived therefrom and/or a trajectory of another vehicle can be mathematically derived from the trajectory of one vehicle.

Figure 18:
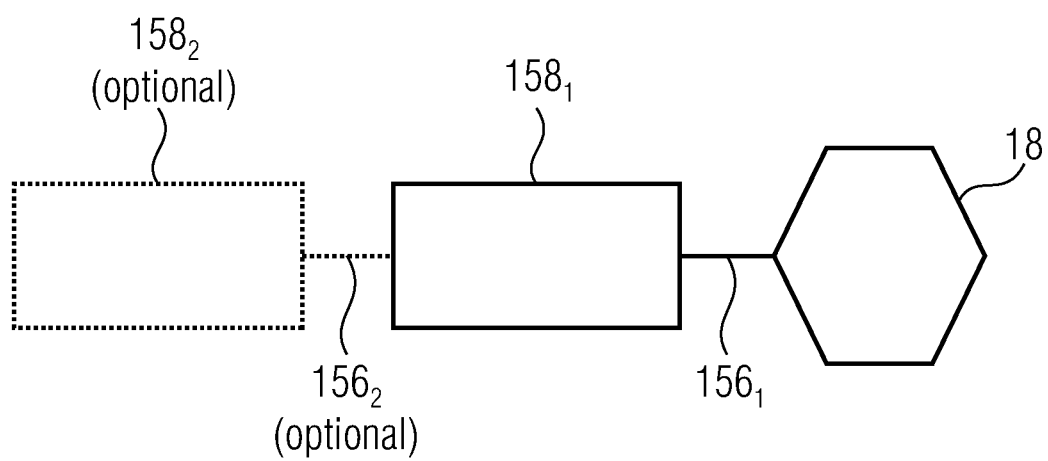
FIG. 18 is a schematic block diagram of an arrangement consisting of a sorting vehicle and a trailer coupled thereto by means of a coupling, a schematic top view of two sorting vehicles coupled to each other according to an embodiment.

FIG. 18 shows a schematic block diagram of an arrangement of a sorting vehicle 18 and a trailer 158 coupled thereto by means of a coupling $156_1$, which also has a running gear but is pulled along by the transport vehicle 18 by being coupled by means of the coupling $156_1$. The sorting vehicle of FIG. 18 is configured to be coupled to at least one trailer, the trailer $158_1$ being configured to receive a sorting good. Optionally, at least one additional trailer $158_2$ may also be coupled, wherein each of the trailers $158_1$ and/or $158_2$ may receive at least one additional sorting good. In this regard, it is possible, but not necessary, to couple the trailer to a particular side, such as a rear side, of the sorting vehicle or the other trailer. Rather, especially using an omnidirectional drive unit or omnidirectional active or passive running gear, coupling can be done on any side, which also opens up the possibility of coupling multiple trailers on different sides of a sorting vehicle or trailer. Alternatively, it is possible to provide two adjacent vehicles, such as the sorting vehicle 18 and the trailer $158_1$ and/or the trailer $158_1$ and the trailer $158_2$ for receiving a common sorting good.

A sorting system according to an embodiment is configured to control buffering and/or sequencing of a plurality of sorting goods on a sorting vehicle and at least one trailer or on at least two trailers. For this purpose, the sorting system can adapt an order with which the sorting goods are present on the loaded convoy of loading areas to one or more criteria. To this end, one, more, or all of the sorting goods may optionally be identified in advance, which may provide additional information, such as their destination inside or outside the sorting center, weight, or other relevant parameters. For example, the order in which sorting goods are placed on the sequence or convoy of loading areas when the sorting vehicle 18 and one or more trailers 158 pass may be based on what destinations the sorting goods have in the sorting system, which may allow, for example, the frontmost sorting good to always be placed or the last sorting good to always be placed, such as by disconnecting the trailer or the like. If sequencing is carried out on trailers, this can be done, for example, in the area of the terminal points. In this case, a chute-like end station described herein is not required, and a surface provided may suffice. For example, during sorting, the individual sorting goods arrive at the terminal point area in random order. In the case of trailers, for example, they could be deposited in an orderly fashion substantially according to their order of arrival at the terminal point, or they could be deposited sorted into a predetermined sequence. In particular, the sequence can represent the optimal loading order of a subsequent instance, for example a parcel delivery vehicle, a rolling container, a truck or the like, depending on the delivery route to the final parcel recipients. Optimization steps for such tours can be considered directly in the sequencing. Manual sorting is then no longer necessary during loading, and less effort is used during delivery to find the right parcel in the parcel delivery vehicle. Buffering, i.e. temporarily picking up sorting goods, and/or sequencing can, for example, take place exclusively on vehicles, exclusively on trailers, or a combination.

As explained, for example, with reference to FIG. 18, sequencing can be controlled by the sorting system so that a plurality of sorting goods is placed on a plurality of loading areas of a loading area convoy. Each loading area can be associated with a sorting vehicle or a trailer, with the trailer being moved by the sorting vehicle, coupled directly to the vehicle or indirectly, for example coupled via other trailers. Several variations are conceivable for sequencing. Buffering and/or sequencing only on sorting vehicles. For this purpose, several vehicles can be controlled individually or in combination. Alternatively or additionally, buffering and/or sequencing can be performed exclusively on trailers, so that a plurality of sorting goods is placed on a plurality of trailers. The trailers may be arranged or positioned at the appropriate location by one or more sorting vehicles. Alternatively or additionally, buffering and/or sequencing can take place on trailers and vehicles so that a plurality of sorting goods is placed on at least one vehicle and at least one trailer, possibly arranged or positioned by at least one sorting vehicle.

The implementations of a sorting system described herein are aimed at the object of enabling efficient sorting of at least one, but usually several, input streams of piece goods or sorting goods onto several, usually many, output streams. For example, the sorting of parcel shipments, in particular in parcel sorting centers, can be considered as the main application, possibly also in the outgoing goods area of large distribution centers. In addition, it is conceivable that the described sorting systems could also be used for sorting suitcases at airports. Another application could be the use in the area of two-stage picking. Goods which have previously been picked on an item-by-item basis, i.e. not in relation to specific orders, can then be sorted by the sorting system on an order-by-order basis, i.e. distributed to the individual orders.

Even though the embodiments described herein are primarily related to the main application of sorting parcel shipments, the applications of the present invention are not limited to this.

In the embodiments, particular attention is paid to the context of an overall system.

A sorting system according to embodiments may have one or more of the following components:
Insertion points, at least one or several centralized or decentralized
  Insertion points do not have to be defined areas; they can also be ad-hoc areas where sorting goods (especially parcel shipments) are lying loose on the floor (also in containers/swap bodies, etc.).
    from there optionally automatic pick-up by sorting vehicles from the floor, e.g. by rolling up by means of inclined small belt conveyor
      either via additional tools all sorting vehicles have, or
      advantageously, an exchangeable (e.g. mechanically or magnetically) dockable tool, which is located in the area of the insertion points and which is used there by the sorting vehicles only to pick up a sorting good and which is then undocked again so that the next sorting vehicle can use the tool.
  Sorting goods can be placed on the vehicle by the gripper of a (jointed-arm) robot; if appropriate, the vehicle does not even have to stop completely for this, because the trajectories of movement of the robot and the vehicle are synchronized; the (jointed-arm) robot can also be mounted on its own vehicle for this purpose.

Passive insertion points from which the vehicle picks up the sorting goods on its way out (passive in the sense that no actuators are required for the actual process of pickup by the sorting vehicle at the pickup station, but only the actuators of the vehicle are used); e.g. comb-type insertion point In principle, sorting goods can also be placed on the sorting vehicle by hand (at standstill or during slow pass-by)

Identification devices (optional): one or more centralized or decentralized devices that identify one or more characteristics of the sorting goods (e.g., a barcode) and derive a transport destination for the vehicles from this (and transmit it to the vehicle or control system)

Background: Because an identification feature can in principle be located on six different sides of a typically cube-shaped item (e.g. cardboard box), conventional sorting systems use so-called scanner gates (6-sided reading) which can identify the sorting good regardless of its positioning. These are very expensive due to the larger number of complex (because of high speed requirements) sensors. For this reason, they have so far advantageously only existed once or very rarely per sorting system near the (so far always central) insertion.

However, vehicle-based sorting systems according to embodiments also enable decentralized insertion. One or two sensors are sufficient to enable cost-effective automatic identification in embodiments. For this purpose, the vehicle drives past the sensor with the sorting good, for example, which is aligned "looking" at the sorting good at an angle and can thus always scan at least two sides of the sorting good. If the sorting good cannot be identified, the vehicle rotates until the sorting good has been identified. If the vehicle has rotated once by 360° and the identification was not successful, the identification feature was on the current bottom of the sorting good. Several variations are conceivable for this:

the bottom is already checked by a second sensor before the load is picked up at the insertion point the vehicle discharges the sorting good onto a tipping device, from which it is then picked up again/put back, wherein the sorting good then rests on the vehicle on a different side than before. Subsequently, it is again passed by the one stationary sensor and turned, if appropriate. The identification feature should now be read. Otherwise, there is an error and the sorting good needs to be taken to a separate manual clearing station.

the vehicle has its own sensor that can detect an identification feature located at the bottom of the sorting good If appropriate, this (or a separate) sensor system can also be used to check the alignment of the sorting goods on the vehicle. If this is not optimal/safe for transport, the control system or the control on the vehicle can correct the positioning of the sorting goods on the vehicle by a targeted jerky movement of the drive motors.

The identification device can also be mounted movably on a vehicle and can be used at different locations/terminal points Sorting vehicles, several automatically moving Sorting vehicles can rotate around their center point (central differential kinematics), but alternatively and advantageously even with surface-moving running gear Sorting vehicles have a load pick-up and load discharge device load discharge automatically without additional motor, movement of load initiated by vehicle travel→Kinetic energy for load discharge results from travel motors (vehicle can travel relatively fast)

discharge due to mass inertia, driving against a bumper (padded or spring-loaded stop) or due to heavy braking; alternatively or additionally: load securing and unsecuring due to friction change of the supporting surface load discharge with folding tray, wherein the force for folding during load discharge also results from the travel movement load pick-up of static load (i.e. without the need for synchronized movement) automatically possible by the sorting vehicle without the need for an additional motor (principle comb load pick-up device, i.e. a comb-like attachment on the vehicle on which the picked-up load is placed, or similar)

Sorting vehicle can steer/turn when cornering in such a way that the load is prevented from falling sideways in curves Sorting vehicles can couple to one another and also couple and uncouple passive trailers Several sorting vehicles can transport larger sorting goods together without being physically coupled to one another; in this way, large/unshapely so-called bulky goods which do not fit on a single vehicle can also be transported (in classic automatic sorting centers, the sorting of bulky goods is without exception a time-consuming manual special process); in conventional technology of vehicle-based sorting systems, there is no known automatic transport of bulky goods Optionally, the sorting vehicle has an information device, such as a display and/or an acoustic output, which transmits additional information on the sorting goods to the person placing/accepting the sorting goods; this information can be, for example, the position of the sorting goods (especially the parcel shipment) in the sequence of the delivery trip, which enables route-optimal sorting in the delivery vehicle; this additional information can also be, for example, in which of several available carts/ULDs (especially in the case of luggage) the sorting goods are to be placed by the person. This means that at least one sorting vehicle can have an information interface to output information associated with the sorting goods.

The vehicle can use a ground camera as a localization method. Alternatively or additionally, other methods (e.g. SLAM or external localization by means of cameras) are also conceivable.

The vehicle can use anti-slip control.

Terminal points, multiple

Terminal points can also be defined by changing objects (delivery vehicles, swap bodies, ULD (Unit Load Device, especially for suitcases) and also changing positions at basically any position in the layout (especially carts) instead of simple installed infrastructure (chutes, etc.), without the need for infrastructure as is the case in the conventional technology.
    can be passive chutes, with flat or sloping surfaces; then also have a buffer function
        Discharge due to inertia (see description of sorting vehicle)
    can be comb-like discharge points
        on which the sorting vehicle drops off/wipes off the sorting good when entering (possibly also, but not necessarily, in the passage).
    Picking by (if appropriate mobile) robot with gripper which places the sorting goods in delivery vehicle, ULD, rack, swap body, roll container or other buffer
    Picking from the sorting vehicle possibly by a human (if appropriate incl. display of additional information, see sorting vehicle)
Control logic (centralized or decentralized)
    Coordination of job assignment (negotiation if appropriate).
    Coordination of travel routes (fastest/shortest route vs. collisions), esp. when traveling without fixed routes on advantageously direct paths
    System can control buffering and sequencing of tags
    Layout very variable, positioning of insertions, terminal points and identification devices can be adapted as desired, number of vehicles as well; control logic takes this into account In the mentioned sorting system, in which at least one driverless sorting vehicle 18 has an information interface to output information associated with the sorting goods 14, the sorting vehicle may be configured to detect parameters of the load, such as by sensor technology and/or set-up tools, and to add them to the central management system of the load carrier information. For example, the sorting vehicle may measure the weight of the load and/or recognize barcodes and/or dimensions with an identification unit.

Due to the use of vehicles as sorting equipment, a vehicle-based sorting system is much more scalable in terms of throughput than conventional fixed sorting systems. Because no (in the case of manual feeding of the sorting goods to the vehicles) or very little technology is required in the area of insertion and separation, insertion can also take place at several decentralized locations. This leads to the advantage that vehicles have a much shorter empty run shortly after discharge at a terminal point than if they (like, e.g., the folding trays of a conventional sorter) had to travel again to a central insertion. However, even in the case of a central insertion in a vehicle-based sorting system, a vehicle can drive back towards the insertion directly after discharge, while the (e.g.) folding tray at first drives the entire round on a ring sorter.

Compared to the conventional technology in sorting with vehicles, the load handling device of the sorting vehicles does not necessarily require a separate motor. In addition, (in some variations) the load can be picked up without stopping the vehicle. Load discharge can also take place without stopping (comb-like) or at high speed (discharge with inertia).

Ideally, the sorting system uses only an empty room, i.e. a building of basically any shape with a planar floor (it makes sense to have loading ramps for trucks, swap bodies, delivery vehicles, etc. on the outer walls). Incoming parcel shipments are singled and inserted by means of dockable tools, mobile jointed-arm robots or manually. Subsequently, the parcel shipments now lying on the sorting vehicle are identified by means of an identification device mounted, for example, on another vehicle. After the trip to the sorting destination, there is either a robot or a human being at the terminal point who picks up the parcel and places it in a cart. In this ideal case, no permanently installed infrastructure is required (possibly only communication infrastructure).

But even in a technically less demanding case of load pickup at the insertion, only very simple and space-saving comb-like racks are required from which the sorting vehicles pick up the parcel shipments. These do not have to be screwed to the hall floor. The same applies to load transfer at the terminal points. Here, either simple racks are also conceivable, onto which the vehicles insertion, or, if the terminal station has to buffer, simple inclined planes (sheets, rolls), onto which the vehicle drops the parcel shipment, advantageously without touching the terminal station. In this case, too, very little infrastructure is entailed. It can also be set up and decompose very quickly.

All in all, such a sorting system is very flexible, because throughput, number of insertions and number of terminal points are scalable and it is extremely changeable (fast set-up/conversion/decomposition or relocation).

Although some aspects have been described in the context of an apparatus, it is understood that these aspects also represent a description of the corresponding method so that a block or component of an apparatus is also to be understood to be a corresponding method step or a feature of a method step. Similarly, aspects described in connection with or as a method step also constitute a description of a corresponding block or detail or feature of a corresponding apparatus.

Depending on particular implementation requirements, embodiments of the invention may be implemented in hardware or in software. The implementation may be performed using a digital storage medium, for example a floppy disk, a DVD, a Blu-ray disc, a CD, ROM, PROM, EPROM, EEPROM, or a FLASH memory, a hard disk drive, or any other magnetic or optical storage medium on which electronically readable control signals are stored, which can or do interact with a programmable computer system in such a way as to perform the respective method. Therefore, the digital storage medium may be computer-readable. Thus, some embodiments according to the invention comprise a data carrier having electronically readable control signals capable of interacting with a programmable computer system such that any of the methods described herein is performed.

Generally, embodiments of the present invention may be implemented as a computer program product having program code, the program code being operative to perform any of the methods when the computer program product runs on a computer. For example, the program code may also be stored on a machine-readable medium.

Other embodiments comprise the computer program for performing any of the methods described herein, wherein the computer program is stored on a machine-readable medium.

In other words, an example embodiment of the method according to the invention is thus a computer program comprising program code for performing any of the methods described herein when the computer program runs on a computer. Thus, another embodiment of the methods according to the invention is a data carrier (or a digital storage medium or a computer-readable medium) on which the computer program for performing any of the methods described herein is recorded.

Thus, a further embodiment of the method according to the invention is a data stream or sequence of signals representing the computer program for performing any of the methods described herein. The data stream or sequence of signals may, for example, be configured to be transferred via a data communication link, for example via the Internet.

Another embodiment comprises a processing device, such as a computer or programmable logic device, configured or adapted to perform any of the methods described herein.

Another embodiment comprises a computer having installed thereon the computer program for performing any of the methods described herein.

In some embodiments, a programmable logic device (for example, a field-programmable gate array, an FPGA) may be used to perform some or all of the functionalities of the methods described herein. In some embodiments, a field-programmable gate array may interact with a microprocessor to perform any of the methods described herein. In general, in some embodiments, the methods are performed on the part of any hardware device. This may be general-purpose hardware such as a computer processor (CPU), or hardware specific to the method, such as an ASIC.

While this invention has been described in terms of several embodiments, there are alterations, permutations, and equivalents which will be apparent to others skilled in the art and which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

The invention claimed is:

1. A sorting system comprising:
a first number of insertion points configured to provide sorting goods;
a second number of terminal points configured to receive the sorting goods;
a third number of driverless sorting vehicles configured to transport the sorting goods between the first number of insertion points and the second number of terminal points; and
a control device configured to control the driverless sorting vehicles between the first number of insertion points and the second number of terminal points;
wherein at least one driverless sorting vehicle is configured to discharge the sorting good using kinetic energy of the sorting good provided by a travel motion of the driverless sorting vehicle, based on a change of a speed vector of the driverless sorting vehicle.

2. The sorting system according to claim 1, wherein the driverless sorting vehicle is configured to provide, for discharge of the sorting good at a terminal point, braking based on a control of the control device and/or by an impact of the driverless sorting vehicle, and/or the change of the speed vector based on taking a specific turn, and to generate a relative movement of the sorting good relative to the driverless sorting vehicle under the influence of the kinetic energy.

3. The sorting system according to claim 2, wherein the driverless sorting vehicle comprises an omnidirectional drive system and is configured to acquire the change of the speed vector based on a control of the omnidirectional drive system.

4. The sorting system according to claim 1, wherein the driverless sorting vehicle comprises a drive device and a control device for controlling the drive device; wherein the control device is configured to control the drive device for braking the driverless sorting vehicle before reaching the terminal point for discharge of the sorting good to a terminal point, in order to generate a relative movement of the sorting good relative to the driverless sorting vehicle as a result of the braking under the influence of the kinetic energy; in order to effect discharge to the terminal point by means of the relative movement.

5. The sorting system according to claim 1, wherein the driverless sorting vehicle comprises a drive device and a control device for controlling the drive device; wherein the control device is configured to control the drive device for an impact of the driverless sorting vehicle against a contact area of the terminal point for discharge of the sorting good to a terminal point, in order to generate a relative movement of the sorting good relative to the driverless sorting vehicle as a result of the impact under the influence of the kinetic energy; in order to effect discharge to the terminal point by means of the relative movement.

6. The sorting system according to claim 1, wherein the driverless sorting vehicle comprises a sorting good receptacle for transporting the sorting good and for transferring the sorting good to a sorting good transfer station, the sorting good receptacle being arranged on a chassis with running gear, the running gear being coupled to a drive device; and furthermore a control device is provided as a vehicle controller, and the sorting good receptacle is articulated to the chassis so as to be tiltable about a tilting axis and is configured so as to be open or openable at least at a discharge edge, the tilting axis and the discharge edge being arranged relative to each other such that, in the tilted positioning, the sorting good can be transferred to the sorting good transfer station via the discharge edge, wherein, in order to transfer the sorting good to the sorting good transfer station, the sorting good receptacle is tilted about the tilting axis by a torque generated by a change in a vector of the speed of the driverless sorting vehicle and/or by spring loading of the sorting good receptacle.

7. The sorting system according to claim 1, wherein at least one driverless sorting vehicle of the third number of driverless sorting vehicles comprises an interface configured to receive different tools based on a coupling.

8. The sorting system according to claim 1, wherein at least one driverless sorting vehicle is configured to receive a tool intended for an identification of a sorting good and use it for an identification of a sorting good, and to determine a destination of the sorting good based on the identification; or to transmit a result of the identification.

9. The sorting system according to claim 1, wherein at least one driverless sorting vehicle is configured to pick up a sorting good from a floor surface.

10. The sorting system according to claim 1, wherein the control device is configured to control a transfer of a sorting good to a vehicle at an insertion point, and to synchronize a movement of the sorting good in a region of the insertion point with a movement of the driverless sorting vehicle such that the driverless sorting vehicle receives the sorting good while maintaining a residual speed.

11. The sorting system according to claim 1, wherein at least one of the first number of insertion points is arranged and configured as a transfer station to receive a sorting good from a driverless sorting vehicle, wherein the sorting good is picked up by another driverless sorting vehicle.

12. The sorting system according to claim 1, wherein at least one of said first number of insertion points is formed to be comb-like to provide at least one discharge space from which a sorting good is receivable by at least one driverless sorting vehicle by means of wiping from the comb-like insertion point; or wherein at least one terminal point is formed to be comb-like to provide at least one receiving space into which a sorting good is receivable from at least one driverless sorting vehicle by means of wiping at the comb-like terminal point.

13. The sorting system according to claim 1, wherein control and/or rotation of the vehicle is controlled during a turn to counteract the sorting good from falling off the vehicle; or
wherein a driverless sorting vehicle comprises a sorting good receptacle which is bounded in regions by a retaining region configured to at least make it more difficult for a sorting good to slip out or slide out; wherein the control device or a control device of the sorting vehicle is configured to position the retaining region during travel of the driverless sorting vehicle as a transport safeguard for the sorting good on the basis of an actual or expected change in the vector of the speed of the vehicle opposite to the direction of the occurring or expected inertial force.

14. The sorting system according to claim 1, wherein the control device is configured to control at least a first driverless sorting vehicle and a directly uncoupled second driverless sorting vehicle based on mutually dependent trajectories to perform common transport of a sorting good.

15. The sorting system according to claim 1, wherein at least one driverless sorting vehicle comprises an information interface to output information associated with the sorting good.

16. The sorting system according to claim 1, wherein at least one driverless sorting vehicle comprises a processing unit configured to
acquire scanning information, provided by a detection unit, from a scan of a surface, the scanning information comprising information on an inherent feature of the surface; and
extract extraction information for the inherent feature from the scanning information; and
perform matching with a database based on the extraction information, wherein the database stores extraction information for a plurality of inherent features of the surface; and
determine the position of the detection unit in the sorting system based on the matching.

17. The sorting system according to claim 16, wherein the control device is configured to control the vehicle to transport the sorting good starting from a first positioning in a modified second positioning using a position changing device, and to present the sorting good to an identification device again with the second positioning.

18. The sorting system according to claim 17, wherein the identification device is arranged to be transportable in the sorting system, and is configured to be coupled at least in part to at least one driverless sorting vehicle; to be used for identification during coupling in the sorting system and/or to be transported.

19. The sorting system according to claim 1, wherein at least one driverless sorting vehicle comprises:
an omnidirectional drive system configured to provide a movement of the vehicle; the omnidirectional drive system comprising a plurality of omnidirectional drive device, each of the plurality of omnidirectional drive device comprising a decentralized computing device and an associated actuator adapted to provide a motion contribution for the movement;
a control device for providing a control command to the omnidirectional drive system which comprises an instruction to execute the movement;
wherein each of the decentralized computing device is configured to determine a desired movement for the vehicle; and to determine control of the associated actuator from the desired movement for a desired motion contribution; and to determine a deviation between the desired motion contribution and an actual motion contribution and to perform a correction based on the deviation.

20. The sorting system according to claim 1, wherein the control device is configured to assign travel orders to the third number of driverless sorting vehicles by means of the driverless sorting vehicles; or
wherein the control device is configured to allocate travel orders to the third number of driverless sorting vehicles by means of negotiation.

21. The sorting system according to claim 1, wherein at least a subset of the third number of driverless sorting vehicles is configured to move along trajectories in the sorting system;
wherein the control device comprises a computing device configured to calculate a number of trajectories between a number of start points and a number of terminal points, each trajectory being associated with a speed specification for a driverless sorting vehicle along the trajectory;
wherein the control device comprises a coordinating device configured to communicate travel orders to the plurality of driverless sorting vehicles, each travel order comprising a trip from one of the start points to one of the terminal points along one of the trajectories;
wherein the control device comprises a collision avoidance device configured to, for a new travel order, examine a trajectory for possible collisions with another driverless sorting vehicle of the sorting system to acquire collision information indicative of a possible collision; and to change the speed specification associated with the trajectory based on the collision information to acquire a changed speed specification; and to avoid the possible collision;
wherein the sorting system is configured to transmit the new travel order comprising an instruction comprising the trajectory and the modified speed specification, to a controller of a driverless sorting vehicle.

22. The sorting system according to claim 1, configured to control buffering and/or sequencing of a plurality of sorting goods on a driverless sorting vehicle and at least one trailer or on at least two trailers.

23. The sorting system according to claim 1, comprising a sensor device configured to detect a relative actual positioning of a sorting good on a driverless sorting vehicle, wherein the control device is configured to compare the actual positioning with a desired positioning and to detect a deviation from the desired positioning; and to change the actual positioning to at least reduce the deviation.

24. A sorting system comprising:
a first number of insertion points configured to provide sorting goods;
a second number of terminal points configured to receive the sorting goods;
a third number of driverless sorting vehicles configured to transport the sorting goods between the first number of insertion points and the second number of terminal points; and a control device configured to control the driverless sorting vehicles between the first number of insertion points and the second number of terminal points;

wherein at least one driverless sorting vehicle of the third number of driverless sorting vehicles comprises an interface configured to receive different tools based on a coupling.

25. The sorting system according to claim 24, wherein the interface is configured to receive the tool using magnetic coupling; or wherein the interface is configured to receive the tool using mechanical coupling.

26. The sorting system according to claim 24, wherein the driverless sorting vehicle comprises a tool configured to receive a sorting good and configured to be coupled to the interface.

27. The sorting system according to claim 24, comprising a tool configured to receive a sorting good and/or to allow identification of a sorting good, and configured to be coupled to the interface.

28. The sorting system according to claim 24, wherein the driverless sorting vehicle is configured to perform coupling with a provided tool to use the tool to pick up the sorting good, to uncouple the tool, and to leave it at a discharge location.

* * * * *